(12) United States Patent
Okano et al.

(10) Patent No.: US 8,931,856 B2
(45) Date of Patent: Jan. 13, 2015

(54) BRAKE CONTROL APPARATUS AND METHOD FOR CONTROLLING THE SAME

(75) Inventors: Takahiro Okano, Toyota (JP); Daisuke Nakata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 838 days.

(21) Appl. No.: 12/810,379

(22) PCT Filed: Dec. 23, 2008

(86) PCT No.: PCT/IB2008/003603
§ 371 (c)(1),
(2), (4) Date: Jun. 24, 2010

(87) PCT Pub. No.: WO2009/081270
PCT Pub. Date: Jul. 2, 2009

(65) Prior Publication Data
US 2010/0270854 A1 Oct. 28, 2010

(30) Foreign Application Priority Data

Dec. 25, 2007 (JP) ................................. 2007-332617

(51) Int. Cl.
*B60T 8/64* (2006.01)
*B60T 1/10* (2006.01)
(Continued)

(52) U.S. Cl.
CPC ................ *B60T 1/10* (2013.01); *B60T 8/4081* (2013.01); *B60L 2240/423* (2013.01); *B60T 2270/604* (2013.01); *B60W 10/08* (2013.01); *B60W 10/184* (2013.01); *B60W 2510/083* (2013.01); *Y02T 10/642* (2013.01)

USPC ................ 303/152; 303/3; 303/15; 303/155; 303/191

(58) Field of Classification Search
USPC ........ 303/3, 9.61, 13, 15, 152, 155, 157, 158, 303/191, 20, DIG. 1, DIG. 2; 701/70, 78
See application file for complete search history.

(56) References Cited

U.S. PATENT DOCUMENTS 5,839,800 A * 11/1998 Koga et al. ..................... 303/152
6,508,523 B2 * 1/2003 Yoshino ........................ 303/152
(Continued)

FOREIGN PATENT DOCUMENTS

DE 103 62 004 12/2004
DE 10 2005 059 373 6/2006
(Continued)

*Primary Examiner* — Melody Burch
(74) *Attorney, Agent, or Firm* — Oblon, Spivak, McClelland, Maier & Neustadt, L.L.P.

(57) ABSTRACT

A brake control apparatus obtains a required braking force using a hydraulic braking force in combination with a regenerative braking force. The brake control apparatus includes a hydraulic brake unit that controls the hydraulic braking force. When the deviation of an actual hydraulic pressure from a target pressure falls outside a permissible range (d), the hydraulic brake unit controls the actual hydraulic pressure in such a manner that the deviation falls within the permissible range. On the other hand, when the deviation is within the permissible range (d), the hydraulic brake unit maintains the actual hydraulic pressure. The hydraulic brake unit includes a control unit that detects timing (Ta) at which usage of the hydraulic braking force needs to be started to compensate for a deficiency from the required braking force, and that raises (r) the target pressure at the detected timing (ta).

16 Claims, 10 Drawing Sheets

(51) Int. Cl.
*B60T 8/40* (2006.01)
*B60T 15/14* (2006.01)
*B60W 10/08* (2006.01)
*B60W 10/184* (2012.01)

(56) References Cited

U.S. PATENT DOCUMENTS

| | | | |
|---|---|---|---|
| 6,813,553 B2* | 11/2004 | Nakamura et al. | 701/70 |
| 8,186,773 B2* | 5/2012 | Jaeger et al. | 303/152 |
| 2003/0173826 A1 | 9/2003 | Tazoe et al. | |
| 2007/0046099 A1 | 3/2007 | Matsuura et al. | |
| 2007/0241611 A1 | 10/2007 | Shimada et al. | |
| 2008/0007115 A1* | 1/2008 | Mizutani | 303/113.2 |
| 2008/0093179 A1 | 4/2008 | Jager et al. | |
| 2011/0049969 A1* | 3/2011 | Park | 303/3 |

FOREIGN PATENT DOCUMENTS

| | | |
|---|---|---|
| JP | 2001 260834 | 9/2001 |
| JP | 2006 123889 | 5/2006 |
| JP | 2006 232117 | 9/2006 |
| JP | 2007 276655 | 10/2007 |

* cited by examiner

BRAKE CONTROL APPARATUS AND METHOD FOR CONTROLLING THE SAME

BACKGROUND OF THE INVENTION

1. Field of the Invention

The invention relates to a brake control apparatus that controls barking forces that are applied to wheels of a vehicle, and a method for controlling the same.

2. Description of the Related Art

For example, Japanese Patent Application Publication No. 2006-123889 (JP-A-2006-123889) describes a brake control apparatus that is equipped with so-called brake-by-wire technology. According to the brake-by-wire technology, a brake operation performed by a driver is detected, and a braking force that is required by the driver is generated under electronic control. With the brake control apparatus, a cooperative braking control, in which a required braking force is obtained by combining a regenerative braking force with a hydraulic braking force, is executed. Using a regenerative braking force along with a hydraulic braking force improves the fuel efficiency of a vehicle. In the brake control apparatus, paired linear control valves, which are shared by all wheel cylinders, control wheel cylinder pressures in the respective wheel cylinders. In terms of cost performance, providing only one pair of linear control valves is better than providing linear control valves for respective wheel cylinders.

In the cooperative braking control, the brake control mode may be switched from a brake control mode in which the required braking force is obtained only by the regenerative braking force to a brake control mode in which the hydraulic braking force is used along with the regenerative braking force to obtain the required braking force. In this case, some control characteristics of the hydraulic braking force may affect the braking feel felt by a driver, for example, a delay in response of the hydraulic braking force to an operation may give a sense of discomfort to the driver. For example, the rate of change in the vehicle deceleration is slightly decreased temporarily, which may cause the driver to feel that the brakes have become less effective.

SUMMARY OF THE INVENTION

The invention provides a brake control apparatus that smoothly switches the brake control mode to a mode in which a hydraulic braking force is used in combination with a regenerative braking force, thereby reducing sense of discomfort felt by a driver, and a method for controlling the brake control apparatus.

A first aspect of the invention relates to a brake control apparatus that obtains a required braking force using a hydraulic braking force in combination with a regenerative braking force. The brake control apparatus includes a hydraulic brake unit that controls the hydraulic braking force. When the deviation of an actual hydraulic pressure from a target pressure falls outside a permissible range, the hydraulic brake unit controls the actual hydraulic pressure in such a manner that the deviation falls within the permissible range. On the other hand, when the deviation is within the permissible range, the hydraulic brake unit maintains the actual hydraulic pressure. The hydraulic brake unit includes a control unit that detects timing at which usage of the hydraulic braking force needs to be started to compensate for a deficiency from the required braking force, and that raises the target pressure at the detected timing.

According to the first aspect of the invention, the timing at which usage of the hydraulic braking force needs to be started to compensate for the deficiency from the required braking force is detected, and the target pressure is raised at the detected timing. Thus, an increase in the target pressure is promoted so that the deviation of the actual hydraulic pressure from the target pressure falls outside the permissible range more easily. Accordingly, the control over the actual hydraulic pressure is started more promptly. As a result, it is possible to smoothly switch the brake control mode to the mode in which the hydraulic braking force is used in combination with the regenerative braking force.

In the first aspect of the invention, the control unit may raise the target pressure at the detected timing in such a manner that the deviation falls outside the permissible range.

With this configuration, the target pressure is raised at the timing, at which usage of the hydraulic braking force needs to be started to compensate for a deficiency from the required braking force, in such a manner that the deviation falls outside the permissible range. Therefore, the control over the actual hydraulic pressure is started immediately. As a result, the required braking force is smoothly obtained by using the hydraulic braking force in combination with the regenerative braking force.

In the first aspect of the invention, the control unit may regard timing, at which it is determined that an actual output value of the regenerative braking force is smaller than the required braking force that is prepared a predetermined time before detection of the output value, as timing at which usage of the hydraulic braking force needs to be started to compensate for the deficiency from the required braking force.

With this configuration, the timing, at which usage of the hydraulic braking force needs to be started to compensate for the deficiency from the required braking force, is estimated by comparing the actual output value of the regenerative braking force with the required braking force. Because the output value of the regenerative braking force is compared with the required braking force that is prepared the predetermined time before detection of the output value, for example, a delay in response due to communication time that is required to exchange signals between the control units is taken into account in comparison between the regenerative braking force and the required braking force. Therefore, it is possible to detect the accurate timing at which usage of the hydraulic braking force needs to be started to compensate for the deficiency from the required braking force.

In the first aspect of the invention, the control unit may raise the target pressure on condition that the target pressure or the actual hydraulic pressure is within a predetermined low-pressure region.

When the brake fluid pressure is low, it is relatively difficult to increase the hydraulic pressure in response to an increase in the brake operation amount. Therefore, a delay in response of the hydraulic pressure to the control is likely to occur. Accordingly, if the condition that the target pressure or the actual hydraulic pressure is within the low-pressure region is used as the permission condition in the target value raising control, it is possible to effectively reduce the influence of a relay in response of the hydraulic pressure to the control.

In the first aspect of the invention, the control unit may raise the target pressure on condition that the required braking force is increasing.

When the required braking force is decreasing or maintained, usually, the target pressure need not be increased. Accordingly, if the condition that the required braking force is increasing is used as the permission condition in the target value raising control, it is possible to maintain appropriate braking feel when the required braking force is decreasing or maintained.

In the first aspect of the invention, the control unit may raise the target pressure on condition that the deviation is within the permissible range.

When the deviation of the actual hydraulic pressure from the target pressure is within the permissible range, the actual hydraulic pressure is maintained. Accordingly, the timing at which the actual hydraulic pressure starts increasing may be delayed. Therefore, if the condition that the deviation is within the permissible range is used as the permission condition in the target value raising control, it is possible to effectively reduce the influence of the delay in the start of an increase in the hydraulic pressure. In addition, it is possible to prevent the target pressure from being unnecessarily raised.

In the first aspect of the invention, the control unit may be able to execute first target pressure raising control for raising the target pressure at the detected timing, and second target pressure raising control for compensating for a delay in response of the actual hydraulic pressure to the target pressure in an early stage of a brake operation. The first target pressure raising control is preceded by the second target pressure raising control. The first target pressure raising control may be executed on condition that the second target pressure raising control is not executed.

With this configuration, it is possible to avoid the situation where both the first target pressure raising control and the second target pressure raising control are executed. Therefore, it is possible to prevent an excessive increase in the target pressure due to execution of both the first target pressure raising control and the second target pressure raising control.

In the first aspect of the invention, the control unit may restrict the number of times the target pressure is raised during one brake operation to a predetermined value.

With this configuration, because the number of times the target pressure is raised is restricted, it is possible to prevent the target pressure from being excessively increased.

In the first aspect of the invention, the control unit may cancel raising of the target pressure while the required braking force is decreasing.

With this configuration, the target pressure raised amount is decreased while the required braking force is decreasing. Therefore, it is possible to minimize the influence of a decrease in the target pressure raised amount on the braking feel.

A second aspect of the invention relates to a brake control apparatus that obtains a required braking force using a hydraulic braking force in combination with a regenerative braking force. The brake control apparatus includes a hydraulic brake control unit that regards timing, at which it is determined that an actual output value of the regenerative braking force is smaller than the required braking force that is prepared a predetermined time before detection of the output value, as timing at which usage of the hydraulic braking force needs to be started to compensate for a deficiency from the required braking force.

A third aspect of the invention relates to a brake control apparatus that obtains a required braking force using a hydraulic braking force in combination with a regenerative braking force. The brake control apparatus includes a hydraulic brake unit that controls the hydraulic braking force. When the deviation of an actual hydraulic pressure from a target pressure falls outside a permissible range, the hydraulic brake unit controls the actual hydraulic pressure in such a manner that the deviation falls within the permissible range. On the other hand, when the deviation is within the permissible range, the hydraulic brake unit maintains the actual hydraulic pressure. The hydraulic brake unit includes a control unit that detects timing at which usage of the hydraulic braking force needs to be started to compensate for a deficiency from the required braking force, and that executes pressure-increase promotion control so that the actual hydraulic pressure starts increasing at the detected timing.

According to the aspects of the invention described above, it is possible to smoothly switch the brake control mode to the mode in which the hydraulic braking force is used in combination with the regenerative braking force in the cooperative braking control.

BRIEF DESCRIPTION OF THE DRAWINGS

The features, advantages and technical and industrial significance of this invention will be described in the following detailed description of an example embodiment of the invention with reference to the accompanying drawings, in which like numerals denote like elements and wherein.

DETAILED DESCRIPTION OF THE EXAMPLE EMBODIMENT

With a brake control apparatus according to an embodiment of the invention, a required braking force is obtained by executing a cooperative braking control in which a braking force obtained by performing a regenerative operation on an electric motor (hereinafter, referred to as "regenerative braking force" where appropriate) and a frictional braking force obtained by controlling a hydraulic pressure (hereinafter, referred to as "hydraulic braking force" where appropriate) are used in combination in order to improve the fuel efficiency of a vehicle. The regenerative braking force is a braking force that is applied to wheels by operating the electric motor, which is usually used to drive the wheels, as an electric power generator that generates electric power using rotating torque of the wheels while the vehicle is moving. The kinetic energy of the vehicle is converted into electric energy, and the electric energy is supplied from the electric motor to an accumulator battery via an electric power converter that includes, for example, an inverter, and is accumulated in the accumulator battery. The electric energy accumulated in the accumulator battery will be used to, for example, drive the wheels, thereby contributing to an improvement in the fuel efficiency of the vehicle. The hydraulic braking force is a braking force that is applied to the wheels by pushing friction members against rotating members that rotate together with the wheels using a hydraulic fluid supplied from a hydraulic pressure source. In order to further improve the fuel efficiency, preferably, the regenerative braking force is preferentially used, and the hydraulic braking force is used to compensate for a deficiency from the required braking force that is caused if only the regenerative braking force is used.

Figure 1:
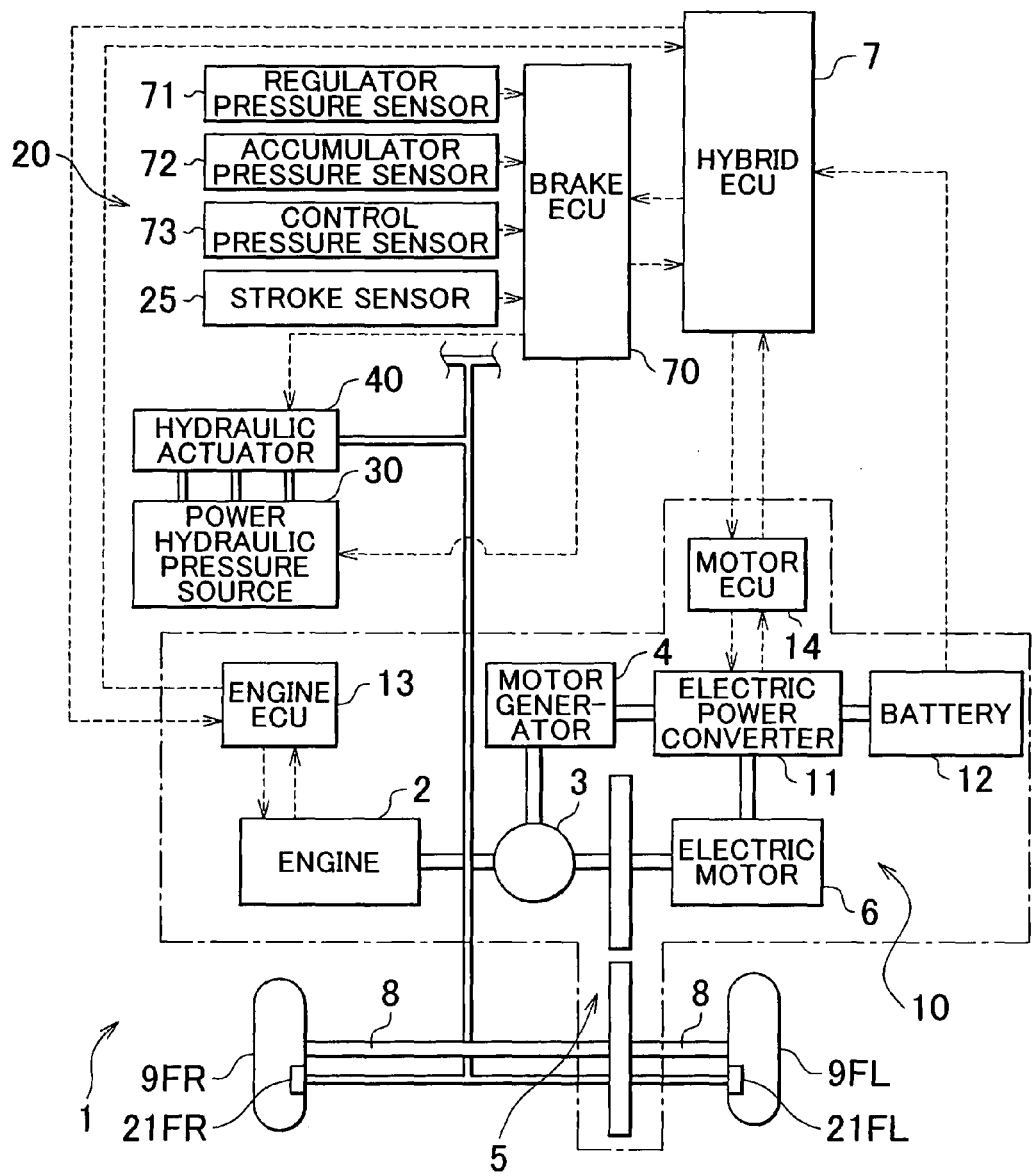
FIG. 1 is a view schematically showing the structure of a vehicle that is provided with a brake control apparatus according to an embodiment of the invention.

FIG. 1 is a view schematically showing a vehicle that is provided with the brake control apparatus according to the embodiment of the invention. A vehicle 1 shown in FIG. 1 is a so-called hybrid vehicle. The vehicle 1 includes an engine 2, a three-shaft power split mechanism 3 that is connected to a crankshaft which serves as an output shaft of the engine 2, a motor generator 4 that is connected to the power split mechanism 3 and that is able to generate electric power, an electric motor 6 that is connected to the power split mechanism 3 via a transmission 5, and an electronic control unit 7 for a hybrid system, which controls the entirety of a drive system of the vehicle 1 (hereinafter, referred to as "hybrid ECU 7"). Hereinafter, each of all electronic control units will be referred to as "ECU". A right front wheel 9FR and a left front wheel 9FL are connected to the transmission 5 via a drive shaft 8.

The engine 2 is an internal combustion engine that is driven using hydrocarbon fuel, for example, gasoline or diesel oil. The engine 2 is controlled by an engine ECU 13. The engine ECU 13 is able to communicate with the hybrid ECU 7, and executes fuel injection control, ignition control, intake air control, etc. on the engine 2 based on control signals from the hybrid ECU 7 and signals from various sensors that detect the operating state of the engine 2. The engine ECU 13 provides the hybrid ECU 7 with information concerning the operating state of the engine 2 on an as-required basis.

The power split mechanism 3 has the function of transferring the power output from the electric motor 6 to the right and left front wheels 9FR and 9FL via the transmission 5, the function of distributing the power output from the engine 2 between the motor generator 4 and the transmission 5, and the function of decreasing or increasing the rotational speed of the electric motor 6 and the rotational speed of the engine 2. The motor generator 4 and the electric motor 6 are connected to a battery 12 via an electric power converter 11 that includes an inverter, and a motor ECU 14 is connected to the electric power converter 11. As the battery 12, an accumulator battery, for example, a nickel-hydrogen storage battery may be used. The motor ECU 14 is also able to communicate with the hybrid ECU 7, and controls the motor generator 4 and the electric motor 6 via the electric power converter 11 based on, for example, control signals from the hybrid ECU 7. Each of the hybrid ECU 7, the engine ECU 13, and the motor ECU 14 is formed of a microprocessor that includes a CPU, and includes, in addition to the CPU, a ROM that stores various programs, a RAM that temporarily stores data, an input port, an output port, a communication port, etc.

The electric power from the battery 12 is supplied to the electric motor 6 via the electric power converter 11 under the controls executed by the hybrid ECU 7 and the motor ECU 14. Thus, the electric motor 6 is driven using the electric power from the battery 12, and the right and left front wheels 9FR and 9FL are driven using the power output from the electric motor 6. In an engine operating range in which the engine efficiency is high, the vehicle 1 is driven by the engine 2. In this case, part of the power output from the engine 2 is transferred to the motor generator 4 via the power split mechanism 3, and the motor generator 4 generates electric power using the power transferred from the engine 2. Then, the electric motor 6 is driven using the electric power generated by the motor generator 4, or the battery 12 is charged with the electric power transferred via the electric power converter 11.

When brakes are applied to the vehicle 1, the electric motor 6 is rotated by the power transferred from the front wheels 9FR and 9FL under the controls executed by the hybrid ECU 7 and the motor ECU 14. As a result, the electric motor 6 is operated as an electric power generator. That is, the electric motor 6, the electric power converter 11, the hybrid ECU 7, the motor ECU 14, etc. serve as a regenerative brake unit 10 that applies braking forces to the right and left front wheels 9FR and 9FL by converting the kinetic energy of the vehicle 1 into electric energy.

Figure 2:
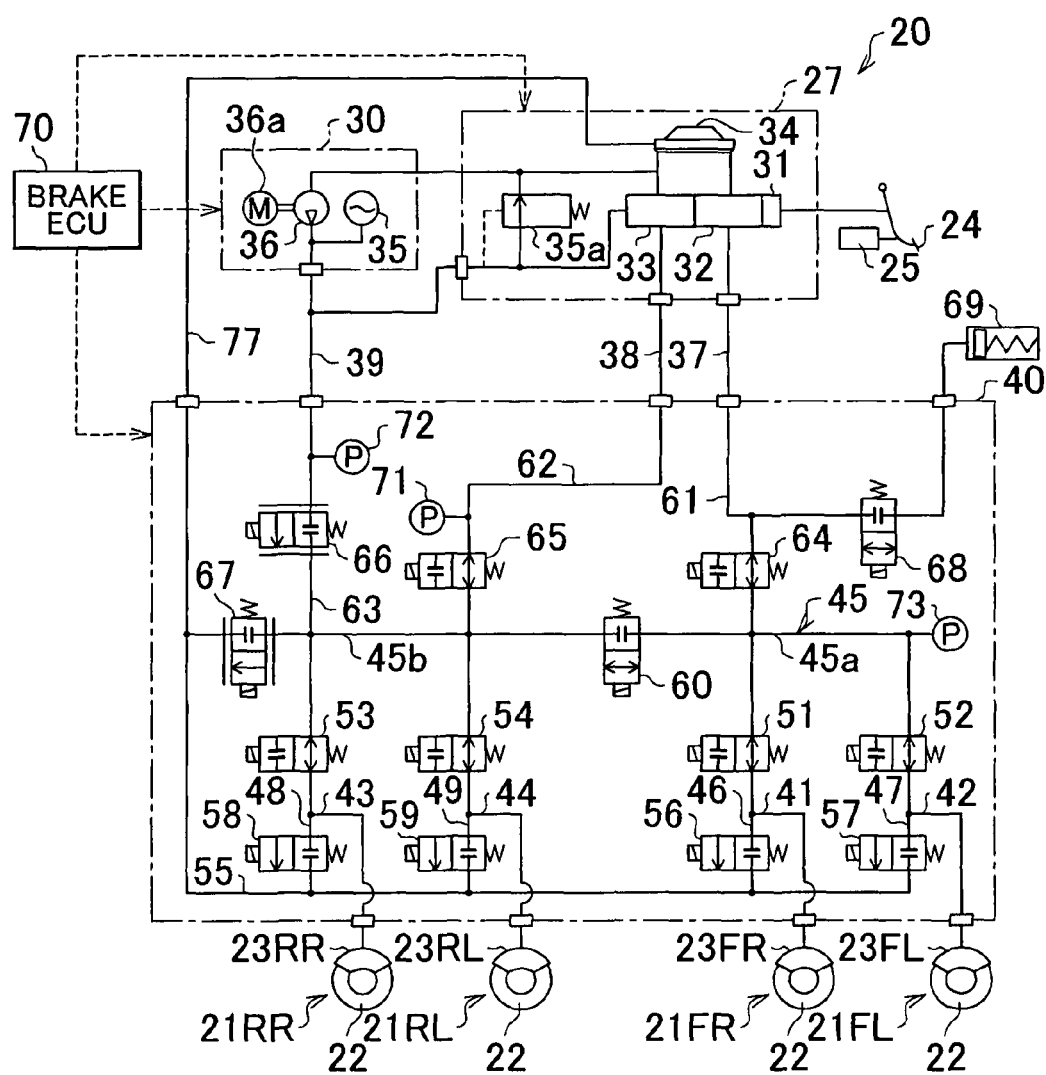
FIG. 2 is a system diagram showing a hydraulic brake unit according to the embodiment of the invention.

The vehicle 1 includes, in addition to the regenerative brake unit 10, a hydraulic brake unit 20 that generates a braking force when supplied with a hydraulic fluid from, for example, a power hydraulic pressure source 30, as shown in FIG. 2. A vehicle brake apparatus according to the embodiment of the invention applies brakes to the vehicle 1 by executing the cooperative braking control in which the regenerative brake unit 10 and the hydraulic brake unit 20 are used in combination. In the vehicle 1 in the embodiment of the invention, it is possible to execute the cooperative braking control to generate desired braking force through combined execution of the regenerative brake operation and the hydraulic pressure brake operation.

FIG. 2 is a system diagram showing the hydraulic brake unit 20 according to the embodiment of the invention. As shown in FIG. 2, the hydraulic brake unit 20 includes disc brake units 21FR, 21FL, 21RR and 21RL that are fitted to respective four wheels, a master cylinder unit 27, the power hydraulic pressure source 30, and a hydraulic actuator 40.

The disc brake units 21FR, 21FL, 21RR and 21RL apply braking forces to the right front wheel, the left front wheel, a right rear wheel and a left rear wheel of the vehicle, respectively. The master cylinder unit 27, which serves as a manual hydraulic pressure source in the embodiment of the invention, delivers brake fluid pressurized in accordance with the operation amount of a brake pedal 24, which serves as a brake operating member, to the disc brake units 21FR, 21FL, 21RR and 21RL. The power hydraulic pressure source 30 delivers the brake fluid, used as the hydraulic fluid and pressurized by supplied drive power, to the disc brake units 21FR, 21FL, 21RR and 21RL independently of any operations of the brake pedal 24. The hydraulic actuator 40 adjusts, on an as-required basis, the hydraulic pressure of the brake fluid supplied from the power hydraulic pressure source 30 or the master cylinder unit 27, and then delivers the brake fluid to the disc brake units 21FR, 21FL, 21RR and 21RL. Thus, the braking forces that are applied to the respective wheels through the hydraulic pressure brake operation are adjusted.

The disc brake units 21FR, 21FL, 21RR and 21RL, the master cylinder unit 27, the power hydraulic pressure source 30, and the hydraulic actuator 40 will be described below in more detail. The disc brake units 21FR, 21FL, 21RR and 21RL include brake discs 22, and wheel cylinders 23FR, 23FL, 23RR and 23RL incorporated in brake calipers, respectively. The wheel cylinders 23FR to 23RL are connected to the hydraulic actuator 40 via respective fluid passages. Hereinafter, the wheel cylinders 23FR to 23RL will be collectively referred to as the "wheel cylinders 23", where appropriate.

In the disc brake units 21FR, 21FL, 21RR and 21RL, when the brake fluid is supplied from the hydraulic actuator 40 to the wheel cylinders 23, brake pads that serve as friction members are pushed against the brake discs 22 that rotate together with the wheels. Thus, braking force is applied to each wheel. In the embodiment of the invention, the disc brake units 21FR to 21RL are used. Alternatively, other braking force applying mechanisms that include wheel cylinders, for example, drum brake units may be used.

In the embodiment of the invention, the master cylinder unit 27 is provided with a hydraulic pressure booster. The master cylinder unit 27 includes a hydraulic pressure booster 31, a master cylinder 32, a regulator 33, and a reservoir 34. The hydraulic pressure booster 31 is connected to the brake pedal 24. The hydraulic pressure booster 31 amplifies the pedal depression force applied to the brake pedal 24, and then transfers the amplified pedal depression force to the master cylinders 32. Thus, the hydraulic fluid is pressurized. The pedal depression force is amplified by supplying the brake fluid from the power hydraulic pressure source 30 to the hydraulic pressure booster 31 through the regulator 33. Then, the master cylinder 32 generates master cylinder pressure corresponding to a value obtained by amplifying the pedal depression force by predetermined number of times.

The reservoir 34 that stores the brake fluid is provided above the master cylinder 32 and the regulator 33. The master cylinder 32 communicates with the reservoir 34 when the brake pedal 24 is not depressed. The regulator 33 communicates with both the reservoir 34 and an accumulator 35 of the power hydraulic pressure source 30. The regulator 33 generates a fluid pressure that is substantially equal to the master cylinder pressure using the reservoir 34 as a low-pressure source and the accumulator 35 as a high-pressure source. Hereinafter, the hydraulic pressure in the regulator 33 will be referred to as the "regulator pressure" where appropriate. Note that, the master cylinder pressure and the regulator pressure need not be exactly equal to each other. For example, the master cylinder unit 27 may be designed in such a manner that the regulator pressure is slightly higher than the master cylinder pressure.

The power hydraulic pressure source 30 includes the accumulator 35 and a pump 36. The accumulator 35 converts the pressure energy of the brake fluid pressurized by the pump 36 into the pressure energy of the filler gas such as nitrogen, for example, the pressure energy having a pressure of approximately 14 MPa to approximately 22 MPa, and stores the pressure energy. The pump 36 has a motor 36a that serves as a drive power source. An inlet of the pump 36 is connected to the reservoir 34, and an outlet thereof is connected to the accumulator 35. The accumulator 35 is connected also to a relief valve 35a provided in the master cylinder unit 27. When the pressure of the brake fluid in the accumulator 35 abnormally increases and becomes, for example, approximately 25 MPa, the relief valve 35a opens, and the brake fluid having a high pressure is returned to the reservoir 34.

As described above, the hydraulic brake unit 20 includes the master cylinder 32, the regulator 33, and the accumulator 35 that serve as brake fluid supply sources from which the brake fluid is supplied to the wheel cylinders 23. A master pipe 37 is connected to the master cylinder 32. A regulator pipe 38 is connected to the regulator 33. An accumulator pipe 39 is connected to the accumulator 35. The master pipe 37, the regulator pipe 38 and the accumulator pipe 39 are connected to the hydraulic actuator 40.

The hydraulic actuator 40 includes an actuator block having a plurality of passages formed therein, and a plurality of electromagnetically-controlled valves. Examples of the passages formed in the actuator block include individual passages 41, 42, 43 and 44 and a main passage 45. The individual passages 41, 42, 43 and 44 branch off from the main passage 45, and are connected to the wheel cylinders 23FR, 23FL, 23RR and 23RL of the disc brake units 21FR, 21FL, 21RR and 21RL, respectively. Thus, communication is provided between the wheel cylinders 23 and the main passage 45.

ABS maintaining valves 51, 52, 53 and 54 are provided at the middle portions of the individual passages 41, 42, 43 and 44, respectively. Each of the ABS maintaining valves 51, 52, 53 and 54 includes a solenoid subjected to the ON/OFF control and a spring, and is a normally-open electromagnetically-controlled valve that is open when electric power is not supplied to the solenoid. Each of the ABS maintaining valves 51 to 54 allows the brake fluid to flow in either direction, when it is open. Namely, each of the ABS maintaining valves 51 to 54 allows the brake fluid to flow from the main passage 45 to the wheel cylinders 23, and also allows the brake fluid to flow from the wheel cylinders 23 to the main passage 45. When electric power is supplied to the solenoids and the ABS maintaining valves 51 to 54 are closed, the flow of the brake fluid through the individual passages 41 to 44 is shut off.

In addition, the wheel cylinders 23 are connected to a reservoir passage 55 via pressure-decreasing passages 46, 47, 48 and 49 connected to the individual passages 41, 42, 43 and 44, respectively. ABS pressure-decreasing valves 56, 57, 58 and 59 are provided at the middle portions of the pressure-decreasing passages 46, 47, 48 and 49, respectively. Each of the ABS pressure-decreasing valves 56 to 59 includes a solenoid subjected to the ON/OFF control and a spring, and is a normally-closed electromagnetically-controlled valve that is closed when electric power is not supplied to the solenoid. When the ABS pressure-decreasing valves 56 to 59 are closed, the flow of the brake fluid through the pressure-decreasing passages 46 to 49 is shut off. When electric power is supplied to the solenoids and the ABS pressure-decreasing valves 56 to 59 are opened, the brake fluid flows through the pressure-decreasing passages 46 to 49, and the brake fluid is returned from the wheel cylinders 23 to the reservoir 34 through the pressure-decreasing passages 46 to 49 and the reservoir passage 55. The reservoir passage 55 is connected to the reservoir 34 of the master cylinder unit 27 via a reservoir pipe 77.

A partition valve 60 is provided at the middle portion of the main passage 45. The main passage 45 is partitioned into a first passage 45a that is connected to the individual passages 41 and 42, and a second passage 45b that is connected to the individual passages 43 and 44, when the partition valve 60 is closed. The first passage 45a is connected to the wheel cylinders 23FR and the 23FL for the front wheels via the individual passages 41 and 42, respectively. The second passage 45b is connected to the wheel cylinders 23RR and 23RL for the rear wheels via the individual passages 43 and 44, respectively.

The partition valve 60 includes a solenoid subjected to the ON/OFF control and a spring, and is a normally-closed electromagnetically-controlled valve that is closed when electric power is not supplied to the solenoid. When the partition valve 60 is closed, the flow of the brake fluid through the main passage 45 is shut off. When electric power is supplied to the solenoid and the partition valve 60 is opened, the brake fluid flows between the first passage 45a and the second passage 45b in either direction.

In the hydraulic actuator 40, a master passage 61 and a regulator passage 62, which communicate with the main passage 45, are formed. More specifically, the master passage 61 is connected to the first passage 45a of the main passage 45, and the regulator passage 62 is connected to the second passage 45b of the main passage 45. The master passage 61 is connected to the master pipe 37 that communicates with the master cylinder 32. The regulator passage 62 is connected to the regulator pipe 38 that communicates with the regulator 33.

A master cut valve 64 is provided at the middle portion of the master passage 61. The master cut valve 64 is provided on a path through which the brake fluid is supplied from the master cylinder 32 to each wheel cylinder 23. The master cut valve 64 includes a solenoid subjected to the ON/OFF control and a spring, and is a normally-open electromagnetically-controlled valve that is reliably closed by an electromagnetic force which is generated by the solenoid upon reception of a prescribed control current and that is open when electric power is not supplied to the solenoid. When the master cut valve 64 is open, the brake fluid flows between the master cylinder 32 and the first passage 45a of the main passage 45 in either direction. When the prescribed control current is supplied to the solenoid and the master cut valve 64 is closed, the flow of the brake fluid through the master passage 61 is shut off.

A stroke simulator 69 is connected to the master passage 61 via a simulator cut valve 68, at a position upstream of the master cut valve 64. Namely, the simulator cut valve 68 is provided on the passage that connects the master cylinder 32 to the stroke simulator 69. The simulator cut valve 68 includes a solenoid subjected to the ON/OFF control and a spring, and is a normally-closed electromagnetically-controlled valve that is reliably open due to an electromagnetic force which is generated by the solenoid upon reception of a prescribed control current and that is closed when electric power is not supplied to the solenoid. When the simulator cut valve 68 is closed, the flow of the brake fluid through the master passage 61 between the simulator cut valve 68 and the stroke simulator 69 is shut off. When electric power is supplied to the solenoid and the simulator cut valve 68 is opened, the brake fluid flows between the master cylinder 32 and the stroke simulator 69 in either direction.

The stroke simulator 69 includes a plurality of pistons and a plurality of springs. When the simulator cut valve 68 is opened, the stroke simulator 69 generates a reaction force corresponding to the depression force applied to the brake pedal 24 by a driver. Preferably, a stroke simulator that has multi-stage spring characteristics is used as the stroke simulator 69 in order to improve the brake pedal operating feel felt by the driver.

A regulator cut valve 65 is provided at the middle portion of the regulator passage 62. The regulator cut valve 65 is provided on a path through which the brake fluid is supplied from the regulator 33 to each wheel cylinder 23. The regulator cut valve 65 also includes a solenoid subjected to the ON/OFF control and a spring, and is a normally-open electromagnetically-controlled valve that is reliably closed by an electromagnetic force which is generated by the solenoid upon reception of a prescribed control current and that is open when electric power is not supplied to the solenoid. When the regulator cut valve 65 is open, the brake fluid flows between the regulator 33 and the second passage 45b of the main passage 45 in either direction. When electric power is supplied to the solenoid and the regulator cut valve 65 is closed, the flow of the brake fluid through the regulator passage 62 is shut off.

In addition to the master passage 61 and the regulator passage 62, an accumulator passage 63 is formed in the hydraulic actuator 40. One end of the accumulator passage 63 is connected to the second passage 45b of the main passage 45, and the other end thereof is connected to the accumulator pipe 39 that communicates with the accumulator 35.

A pressure-increasing linear control valve 66 is provided at the middle portion of the accumulator passage 63. The accumulator passage 63 and the second passage 45b of the main passage 45 are connected to the reservoir passage 55 via a pressure-decreasing linear control valve 67. Each of the pressure-increasing linear control valve 66 and the pressure-decreasing linear control valve 67 has a linear solenoid and a spring, and is a normally-closed electromagnetically-controlled valve that is closed when electric power is not supplied to the linear solenoid. The opening amounts of the pressure-increasing linear control valve 66 and the pressure-decreasing linear control valve 67 are adjusted in proportion to the magnitudes of electric currents supplied to the respective linear solenoids.

The pressure-increasing linear control valve 66 is shared by the multiple wheel cylinders 23 corresponding to the respective wheels. Similarly, the pressure-decreasing linear control valve 67 is shared by the multiple wheel cylinders 23. Namely, according to the embodiment of the invention, the pressure-increasing linear control valve 66 and the pressure-decreasing linear control valve 67 are provided as a pair of control valves that are shared by the wheel cylinders 23 and that control the hydraulic fluid supplied from the power hydraulic pressure source 30 to the wheel cylinders 23 and the hydraulic fluid returned from the wheel cylinders 23 to the power hydraulic pressure source 30. In terms of cost performance, providing one pressure-increasing linear control valve 66 and one pressure-decreasing linear control valve 67 that are shared by the multiple wheel cylinders 23 is better than providing linear control valves for the respective wheel cylinders 23.

The pressure difference between an inlet and an outlet of the pressure-increasing linear control valve 66 corresponds to the difference between the pressure of the brake fluid in the accumulator 35 and the pressure of the brake fluid in the main passage 45. The pressure difference between an inlet and an outlet of the pressure-decreasing linear control valve 67 corresponds to the difference between the pressure of the brake fluid in the main passage 45 and the pressure of the brake fluid in the reservoir 34. When the electromagnetic drive power corresponding to the electric power supplied to the linear solenoid of each of the pressure-increasing linear control valve 66 and the pressure-decreasing linear control valve 67 is $F1$, the biasing force of the spring of each of the pressure-increasing linear control valve 66 and the pressure-decreasing linear control valve 67 is $F2$, and the differential pressure acting force corresponding to the pressure difference between the inlet and the outlet of each of the pressure-increasing linear control valve 66 and the pressure-decreasing linear control valve 67 is $F3$, the equation, $F1+F3=F2$, is satisfied. Accordingly, the pressure difference between the inlet and the outlet of each of the pressure-increasing linear control valve 66 and the pressure-decreasing linear control valve 67 is controlled by continuously controlling the electric power supplied to the linear solenoid of each of the pressure-increasing linear control valve 66 and the pressure-decreasing linear control valve 67.

In the hydraulic brake unit 20, the power hydraulic pressure source 30 and the hydraulic actuator 40 are controlled by a brake ECU 70 that serves as a controller according to the embodiment of the invention. The brake ECU 70 is formed of a microprocessor including a CPU. The brake ECU 70 includes, in addition to the CPU, a ROM that stores various programs, a RAM that temporarily stores data, an input port, an output port, a communication port, etc. The brake ECU 70 communicates with the hybrid ECU 7 (not shown), etc. at a higher level. The brake ECU 70 controls the pump 36 of the power hydraulic pressure source 30, the electromagnetically-controlled valves 51 to 54, 56 to 59, 60, and 64 to 68 that form the hydraulic actuator 40 based on the control signals from the hybrid ECU 7 and the signals from various sensors.

A regulator pressure sensor 71, an accumulator pressure sensor 72, and a control pressure sensor 73 are connected to the brake ECU 70. The regulator pressure sensor 71 is provided upstream of the regulator cut valve 65. The regulator pressure sensor 71 detects the pressure of the brake fluid in the regulator passage 62, namely, the regulator pressure, and transmits a signal indicating the detected regulator pressure to the brake ECU 70. The accumulator pressure sensor 72 is provided upstream of the pressure-increasing linear control valve 66. The accumulator pressure sensor 72 detects the pressure of the brake fluid in the accumulator passage 63, namely, the accumulator pressure, and transmits a signal indicating the detected accumulator pressure to the brake ECU 70. The control pressure sensor 73 detects the pressure of the brake fluid in the first passage 45*a* of the main passage 45, and transmits a signal indicating the detected brake fluid pressure to the brake ECU 70. The signals indicating the values detected by the regulator pressure sensor 71, the accumulator pressure sensor 72, and the control pressure sensor 73 are transmitted to the braked ECU 70 at predetermined time intervals, and stored in a predetermined storage region of the brake ECU 70.

When the partition valve 60 is open and the first passage 45*a* and the second passage 45*b* of the main passage 45 communicate with each other, the value output from the control pressure sensor 73 indicates the lower hydraulic pressure at the pressure-increasing linear control valve 66 and the higher hydraulic pressure at the pressure-decreasing linear control valve 67. Accordingly, the value output from the control pressure sensor 73 is used to control the pressure-increasing linear control valve 66 and the pressure-decreasing linear control valve 67. When the pressure-increasing linear control valve 66 and the pressure-decreasing linear control valve 67 are both closed and the master cut valve 64 is open, the value output from the control pressure sensor 73 indicates the master cylinder pressure. When the partition valve 60 is open and the first passage 45*a* and the second passage 45*b* of the main passage 45 communicate with each other, and the ABS maintaining valves 51 to 54 are open while the ABS pressure-decreasing valves 56 to 59 are closed, the value output from the control pressure sensor 73 indicates the hydraulic fluid pressure that is applied to each of the wheel cylinders 23, namely, the wheel cylinder pressure.

Examples of the sensors that are connected to the brake ECU 70 include a stroke sensor 25 fitted to the brake pedal 24. The stroke sensor 25 detects a brake pedal stroke that is an operation amount of the brake pedal 24, and transmits a signal indicating the detected brake pedal stroke to the brake ECU 70. The value output from the stroke sensor 25 is transmitted to the brake ECU 70 at predetermined time intervals, and stored in a predetermined storage region of the brake ECU 70. Brake operation state detection means other than the stroke sensor 25 may be provided in addition to or instead of the stroke sensor 25 and may be connected to the brake ECU 70. Examples of the brake operation state detection means include a pedal depression force sensor that detects an operation force applied to the brake pedal 24 and a brake switch that detects depression of the brake pedal 24.

The brake control apparatus according to the embodiment of the invention, which includes the thus structured hydraulic brake unit 20, executes the cooperative braking control. The hydraulic brake unit 20 starts braking control upon reception of a braking command. A braking command is issued when brakes should be applied to the vehicle, for example, when the driver operates the brake pedal 24. The brake ECU 70 calculates a required braking force upon reception of the braking command, and calculates a required hydraulic braking force, which is a hydraulic braking force that should be generated by the hydraulic brake unit 20, by subtracting a regenerative braking force from the required braking force. The output value of the regenerative braking force is transmitted from the hybrid ECU 7 to the brake ECU 70. The brake ECU 70 calculates target hydraulic pressures for the wheel cylinders 23FR to 23RL based on the calculated required hydraulic braking force. The brake ECU 70 determines values of control currents that are supplied to the pressure-increasing linear control valve 66 and the pressure-decreasing linear control valve 67 by executing feedback control in such a manner that the wheel cylinder pressures match the respective target hydraulic pressures.

As a result, in the hydraulic brake unit 20, the brake fluid is supplied from the power hydraulic pressure source 30 to each wheel cylinder 23 via the pressure-increasing linear control valve 66, whereby braking forces are applied to the wheels. Also, the brake fluid is returned from each wheel cylinder 23 to the power hydraulic pressure source 30 via the pressure-decreasing linear control valve 67, whereby the braking forces that are applied to the wheels are adjusted. In the embodiment of the invention, the power hydraulic pressure source 30, the pressure-increasing linear control valve 66, the pressure-decreasing linear control valve 67, etc. constitute a wheel cylinder pressure control system. The wheel cylinder pressure control system executes so-called brake-by-wire braking force control. The wheel cylinder pressure control system is arranged in parallel with the path through which the brake fluid is supplied from the master cylinder unit 27 to the wheel cylinders 23.

More specifically, the brake ECU 70 selects one of three control classes based on the deviation of the actual hydraulic pressure from the target hydraulic pressure, and controls the hydraulic pressure in the main passage 45, that is, the pressure upstream of the maintaining valves (hereinafter, referred to as "maintaining valve upstream pressure"). The brake ECU 70 controls the maintaining valve upstream pressure by controlling the pressure-increasing linear control valve 66 and the pressure-decreasing linear control valve 67. A pressure-increasing mode, a pressure-decreasing mode, and a pressure-maintaining mode are set as the three control classes. The brake ECU 70 selects the pressure-increasing mode when the deviation exceeds a pressure-increase required threshold value, selects the pressure-decreasing mode when the deviation exceeds a pressure-decrease required threshold value, and selects the pressure-maintaining mode when the deviation is between the pressure-increase required threshold value and the pressure-decrease required threshold value, that is, when the deviation is within a permissible range. The permissible range is used as a so-called dead zone. Within the permissible range, the pressure is neither increased nor decreased. Therefore, the pressure-increasing linear control valve 66 and the pressure-decreasing linear control valve 67 are operated less frequently. Thus, the usable lives of the linear control valves are prolonged. The deviation is calculated, for example, by subtracting the actual hydraulic pressure from the target hydraulic pressure. As the actual hydraulic pressure, for example, a value measured by the control pressure sensor 73 is used. As the target hydraulic pressure, for example, a target value for the maintaining valve upstream pressure, that is, the hydraulic pressure in the main passage 45 is used.

In the embodiment of the invention, when the pressure-increasing mode is selected, the brake ECU 70 supplies a feedback current that corresponds to the deviation to the pressure-increasing linear control valve 66. When the pressure-decreasing mode is selected, the brake ECU 70 supplies a feedback current that corresponds to the deviation to the pressure-decreasing linear control valve 67. When the pressure-maintaining mode is selected, the brake ECU 70 supplies an electric current to neither the pressure-increasing linear control valve 66 nor the pressure-decreasing linear control valve 67, according to the embodiment of the invention. That is, the wheel cylinder pressure is increased using the pressure-increasing linear control valve 66 in the pressure-increasing mode, and the wheel cylinder pressure is decreased using the pressure-decreasing linear control valve 67 in the pressure-decreasing mode. In the pressure-maintaining mode, the wheel cylinder pressure is maintained.

When brake-by-wire braking force control is executed, the brake ECU 70 keeps the regulator cut valve 65 closed so that the brake fluid that is delivered from the regulator 33 is not supplied to the wheel cylinders 23. In addition, the brake ECU 70 keeps the master cut valve 64 closed and keeps the simulator cut valve 68 open. Thus, the brake fluid, which is delivered from the master cylinder 32 in response to an operation of the brake pedal 24 performed by the driver, is supplied not to the wheel cylinders 23 but to the stroke simulator 69. During the cooperative braking control, a differential pressure that corresponds to the magnitude of a regenerative braking force is applied to a portion between the upstream side and the downstream side of each of the regulator cut valve 65 and the master cut valve 64.

Figure 3:
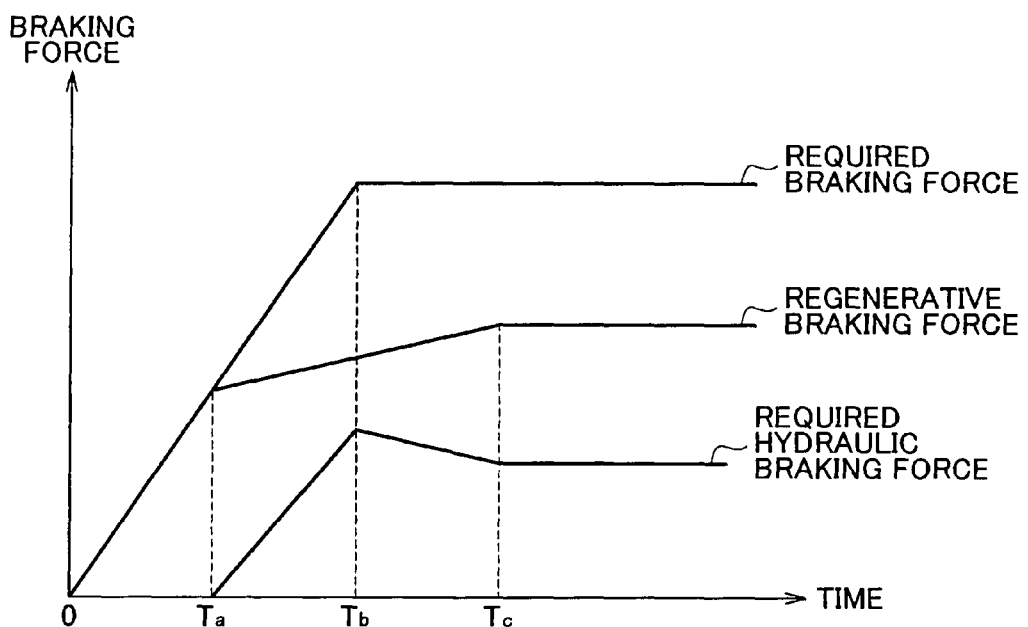
FIG. 3 is a graph schematically showing temporal changes in braking forces in a cooperative braking control according to the embodiment of the invention.

FIG. 3 is a view schematically showing an example of temporal changes in braking forces in the cooperative braking control according to the embodiment of the invention. As described above, in the cooperative braking control according to the embodiment of the invention, in order to improve the fuel efficiency of the vehicle, the regenerative braking force is preferentially used, and the hydraulic braking force is used to compensate for a deficiency from the required braking force that is caused if only the regenerative braking force is used. Therefore, when a braking force required by the driver, that is, a target deceleration for the vehicle is relatively small, it is possible to obtain the required braking force using only the regenerative braking force. On the other hand, when a braking force required by the driver is relatively large, the required braking force is obtained using the hydraulic braking force in addition to the regenerative braking force. Therefore, when the required braking force increases and exceeds the upper limit of the regenerative braking force, the brake control mode is switched from the mode in which brakes are applied to the vehicle using only the regenerative braking force to the mode in which brakes are applied to the vehicle using the hydraulic braking force in addition to the regenerative braking force.

FIG. 3 schematically shows the relationship among the required braking force, the regenerative braking force and the required hydraulic braking force during a period from when a braking command is issued until when the required braking force reaches the maximum value. The regenerative braking force shown in FIG. 3 is an actually output value of hydraulic regenerative braking force. The required hydraulic braking force is a command value, that is, a target value of the hydraulic braking force. In FIG. 3, the ordinate axis represents the magnitude of the braking force, and the abscissa axis represents the time that has elapsed after issuance of a braking command.

As shown in FIG. 3, the required braking force is increased, for example, after issuance of a braking command, and is maintained constant after reaching the maximum value at time $T_b$. The maximum value of the required braking force is larger than the upper limit of the regenerative braking force. The regenerative braking force covers the entirety of required braking force until time $T_a$ that is within a period in which the required braking force is increasing. However, an increase in the regenerative braking force cannot keep up with an increase in the required braking force after time $T_a$. After time $T_a$, the regenerative braking force increases more moderately than before time $T_a$, and reaches the upper limit at time $T_c$. After time $T_a$, a deficiency from the required braking force is compensated for by the hydraulic braking force. Therefore, in the example shown in FIG. 3, time $T_3$ is the timing at which the brake control mode is switched to the mode in which the required braking force is obtained by the hydraulic braking force in addition to the regenerative braking force (hereinafter, referred to as "brake control mode switch timing" where appropriate). As described above, the required hydraulic braking force is a value that is obtained by subtracting the regenerative braking force from the required braking force. Therefore, the required hydraulic braking force starts rising at time $T_a$, and keeps increasing until time $T_b$ at which the required braking force reaches the maximum value. Then, the required hydraulic braking force keeps decreasing until time $T_c$ at which the regenerative braking force reaches the upper limit. After that, the required hydraulic raking force is maintained constant.

The timing at which the hydraulic braking force starts rising lags behind the brake control mode switch timing by a certain amount, which causes a delay in response of the actual total braking force to the required braking force. Although such time lag usually does not cause a problem in the braking performance of the vehicle, it may give a sense of discomfort to the driver. One of the reasons that the timing at which the hydraulic braking force starts rising lags behind the brake control mode switch timing is that the pressure-maintaining mode is set, that is, a dead band having a certain width is set for the required hydraulic braking force.

In the hydraulic brake unit 20 according to the embodiment of the invention, all the wheel cylinder pressures are usually controlled collectively. Therefore, the pressure-increasing control is executed on all the wheel cylinders with the use of pressure-increasing linear control valve 66, that is, the capacity of the target of this control is relatively large. Therefore, the amount of delay in response of the actual total braking force to the required braking force, which is caused when the hydraulic pressure control is started, is relatively large.

Figure 4:
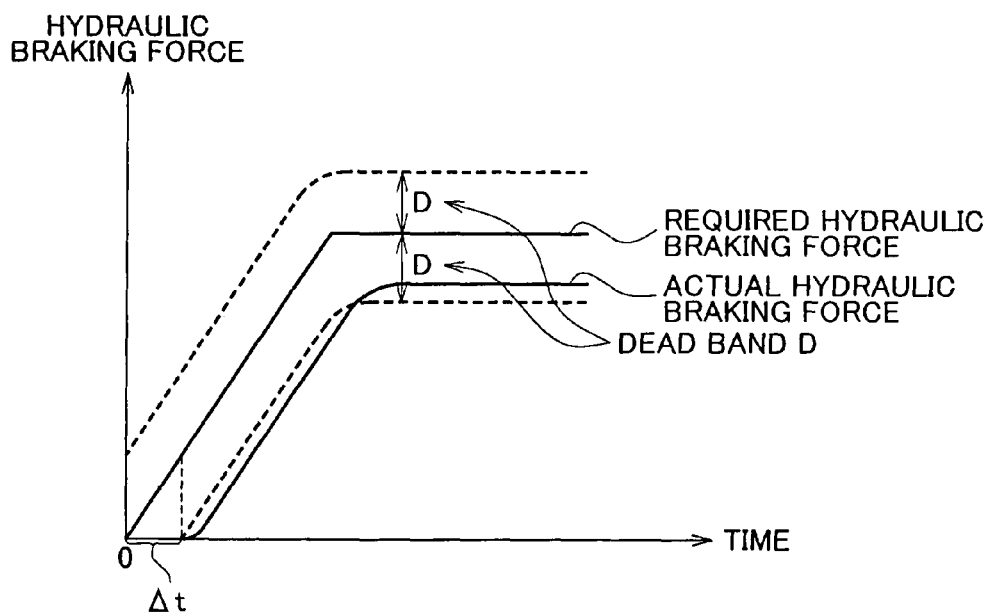
FIG. 4 is a graph schematically showing manners in which hydraulic braking forces rise according to the embodiment of the invention.

FIG. 4 is a graph schematically showing an example of manners in which hydraulic braking forces rise according to the embodiment of the invention. FIG. 4 shows the required hydraulic braking force and the actual hydraulic braking force. A dead band that has a certain width D (hereinafter, referred to as "dead-band width D") is set above and below the line that indicates the required hydraulic braking force. In FIG. 4, the ordinate axis represents the magnitude of hydraulic braking force, and the abscissa axis represents the time that has elapsed after the required hydraulic braking force starts increasing.

As shown in FIG. 4, the required hydraulic braking force increases and reaches the maximum value after a predetermined time has elapsed. The actual hydraulic braking force is maintained at the initial value (zero, in the example shown in FIG. 4) in the pressure-maintaining mode for a while after the required hydraulic braking force starts increasing. The deviation of the actual hydraulic braking force from the required hydraulic braking force exceeds the dead-band width D only after time Δt has elapsed after the required hydraulic braking force starts increasing. Then, the brake ECU 70 switches the brake control mode from the pressure-maintaining mode to the pressure-increasing mode. Thus, the hydraulic braking force starts increasing. As described above, the actual hydraulic braking force increases in response to an increase in the required hydraulic braking force with a certain amount of time lag. In the example in FIG. 4, the width D of the dead band set above the line indicating the required hydraulic braking force is equal to the width D of the dead band set below the line. However, the width D of the dead band set above the line indicating the required hydraulic braking force may be different from the width D of the dead band set below the line.

Figure 5:
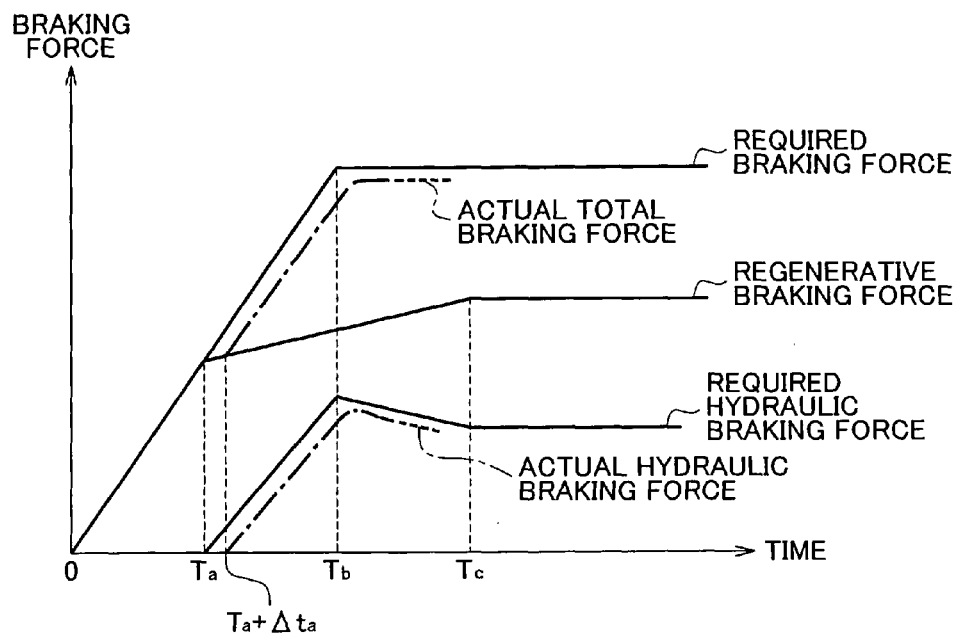
FIG. 5 is a graph schematically showing temporal changes in an actual total braking force and an actual hydraulic braking force according to the embodiment of the invention.

FIG. 5 is a graph schematically showing temporal changes in the actual total braking force and the actual hydraulic braking force in the example shown in FIG. 3. FIG. 5 shows, in addition to the required braking force, the regenerative braking force and the required hydraulic braking force which are shown also in FIG. 3, the actual total braking force and the actual hydraulic braking force using dashed-dotted lines. The actual total braking force is the sum of the actual regenerative braking force and the actual hydraulic braking force.

As shown in FIG. 5, the actual hydraulic braking force starts increasing at time $T_a + \Delta t_a$ that lags behind time $T_a$, at which the required hydraulic braking force starts increasing, by time $\Delta t_a$. This is because time $\Delta t_a$ is required to switch the brake control mode from the pressure-maintaining mode to the pressure-increasing mode, as described with reference to FIG. 4. This causes a delay in response of the actual total braking force to the required braking force in accordance with a delay in response of the actual hydraulic braking force to the required hydraulic braking force after time $T_a$. Therefore, the rate of change in the total braking force drops at time $T_a$.

When the deviation of the actual hydraulic braking force from the required hydraulic braking force falls within the dead-band width D after time $T_b$, the brake control mode is switched from the pressure-increasing mode to the pressure-maintaining mode. Then, when the required hydraulic braking force decreases and the actual hydraulic braking force exceeds the dead-band width D for the required hydraulic braking force, the brake control mode is switched from the pressure-maintaining mode to the pressure-decreasing mode.

As described above, during the period from the brake control mode switch timing, after which the hydraulic braking force needs to be used to compensate for a deficiency from the required braking force, until when the required braking force reaches the maximum value, the actual total braking force is slightly smaller than the required braking force. Until the brake control mode switch timing, substantially the entire required braking force is covered by the regenerative braking force. However, after the brake control mode switch timing, the rate of change in the vehicle deceleration temporarily drops because the timing at which the actual hydraulic braking force starts rising lags behind the brake control mode switch timing. Although such a drop usually does not cause a problem in the braking performance of the vehicle, it may affects the braking feel felt by the driver.

Figure 6:
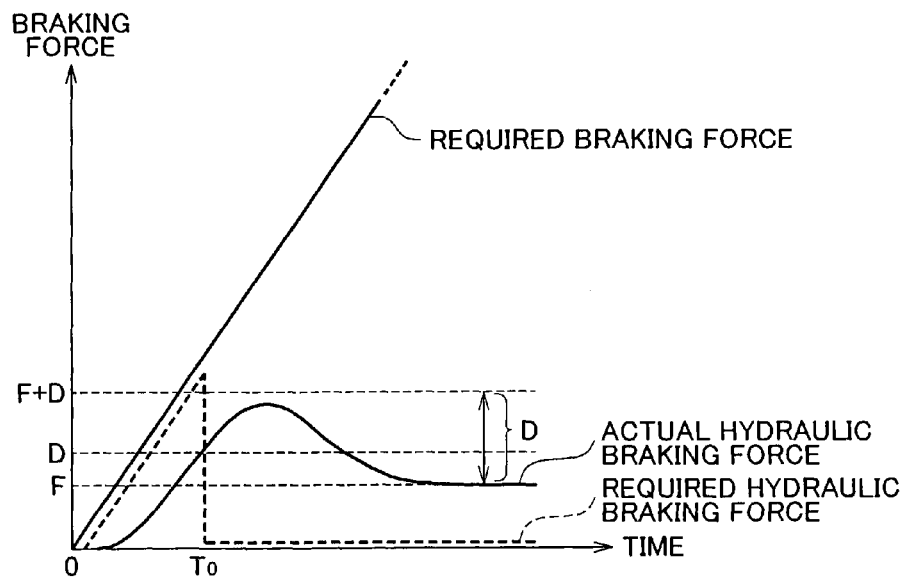
FIG. 6 is a graph schematically showing fluctuations in the hydraulic braking forces immediately after issuance of a braking command according to the embodiment of the invention.

In addition, the actual wheel cylinder pressure may actually be higher than the target hydraulic pressure at the brake control mode switch timing, as shown in FIG. 6. In this case, in order to switch the brake control mode to the pressure-increasing mode, the target hydraulic pressure needs to be first increased so as to exceed the actual hydraulic pressure and then further increased by an amount corresponding to the dead-band width. Accordingly, the time that is required for raising the hydraulic braking force becomes longer.

FIG. 6 schematically shows an example of fluctuations in the hydraulic braking forces immediately after issuance of a braking command according to the embodiment of the invention. The fluctuations in the braking force shown in FIG. 6 are fluctuations near the origin point in each of FIGS. 3 and 5. These fluctuations are not shown in FIGS. 3 and 5 for convenience of explanation. In FIG. 6, the ordinate axis represents the magnitude of braking force, and the abscissa axis represents the time that has elapsed after issuance of a braking command. In order to facilitate understanding, the required braking force and the actual hydraulic braking force are indicated by solid lines, and the required hydraulic braking force is indicated by a dotted line.

In the very early stage of the brake operation, the brake ECU 70 executes control in such a manner that the hydraulic braking force increases in response to an increase in the required braking force until the brake ECU 70 receives an output value of the regenerative braking force from the hybrid ECU 7. The brake ECU 70 executes this control so that even if the regenerative braking force is not generated due to a malfunction, the required braking force is promptly obtained by the hydraulic braking force. When the output value of the regenerative braking force is received properly, the brake ECU 70 executes the cooperative braking control based on the received output value. Immediately after the brake operation is started, the required braking force is usually covered by the regenerative braking force. Therefore, the required hydraulic braking force is set to zero. For example, if the output value of the regenerative braking force is received at time $T_0$, the brake ECU 70 increases the required hydraulic braking force in response to an increase in the required braking force until time $t_0$, and sets the required hydraulic braking force to zero at time $t_0$.

In this case, the actual hydraulic braking force increases in response to an increase in the required hydraulic braking force with a certain amount of time lag. When a predetermined time has elapsed after the required hydraulic braking force is set to zero, the actual hydraulic braking force becomes equal to, for example, a predetermined value F that is larger than zero and smaller than the dead-band width D. The actual hydraulic braking force is maintained at the predetermined value F until the brake control mode switch timing $T_a$ (see FIG. 5).

In order to switch the brake control mode from the pressure-maintaining mode to the pressure-increasing mode when the brake control mode switch timing is reached, the required hydraulic braking force need to be increased to a value obtained by adding the dead-band width D to the predetermined value F (F+D) when the actual hydraulic braking force is F. If the actual hydraulic braking force is zero, the brake control mode is switched to the pressure-increasing mode by increasing the required hydraulic braking force by an amount corresponding to the dead-band width D. However, the actual hydraulic braking force is F. Accordingly, the required hydraulic braking force needs to be increased by a larger amount to switch the brake control mode to the pressure-increasing mode. Therefore, the timing at which the actual hydraulic braking force starts rising further lags behind the brake control mode switch timing.

Therefore, according to the embodiment of the invention, the brake ECU 70 detects the timing at which usage of the hydraulic braking force in combination with the regenerative braking force is started, and executes pressure-increase promotion control so that the wheel cylinder pressure starts increasing. For example, the brake ECU 70 estimates the timing at which usage of the hydraulic braking force needs be started to compensate for a deficiency from the required braking force, and executes control for raising the target value for the hydraulic braking force at this timing. The brake control mode is promptly switched from the pressure-maintaining mode to the pressure-increasing mode by temporarily raising the target pressure. Thus, the brake control mode is smoothly switched to the mode in which the hydraulic braking force is used in combination with the regenerative braking force to obtain the required braking force. As a result, a sense of discomfort felt by the driver is reduced.

Figure 7:
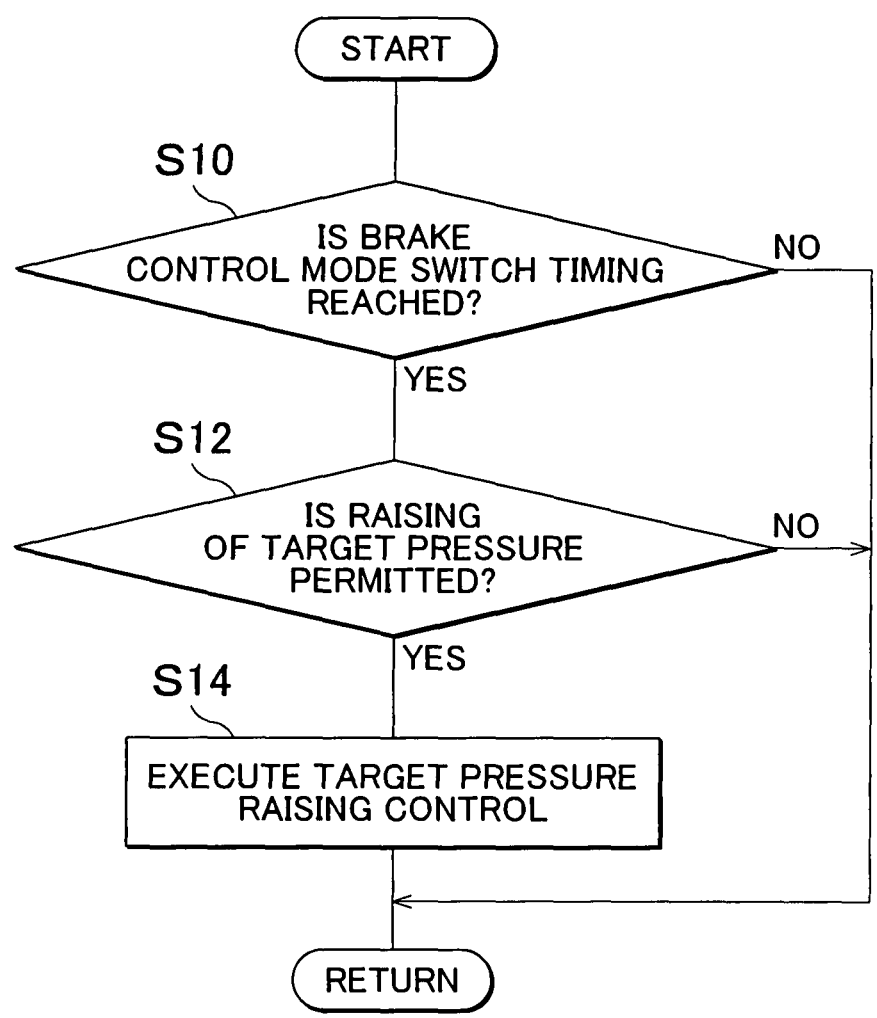
FIG. 7 is a flowchart showing an example of a pressure-increase promotion control according to the embodiment of the invention.

FIG. 7 is a flowchart showing an example of pressure-increase promotion control according to the embodiment of the invention. The control shown in FIG. 7 is periodically executed at predetermined time intervals by, for example, the brake ECU 70 during the brake operation. FIG. 7 shows, as an example of the pressure-increase promotion control, control for raising the target pressure for the wheel cylinder pressure. First, the brake ECU 70 determines whether the brake control mode switch timing is reached (S10). At the brake control mode switch timing, the brake control mode should be switched from the brake control mode in which the required braking force is covered only by the regenerative braking force to the brake control mode in which the hydraulic braking force is used in combination with the regenerative braking force. As described later in detail with reference to FIG. 8, the determination is performed, for example, by comparing the required braking force with the actual output value of the regenerative braking force. For example, the timing, at which it is determined that the state where the regenerative braking force is smaller than the required braking force has continued for a predetermined time, is regarded as the timing, at which usage of the hydraulic braking force needs to be started to compensate for a deficiency from the required braking force. The brake ECU 70 may regard the timing, at which a predetermined time has elapsed after a braking command is issued, as the brake control mode switch timing, instead of detecting the brake control mode switch timing each time. If it is determined that the brake control mode switch timing is not reached ("NO", in S10), the brake ECU 70 ends the control without executing the pressure-increase promotion control.

On the other hand, if it is determined that the brake control mode switch timing is reached ("YES" in S10), the brake ECU 70 determines whether raising of the target pressure should be permitted (S12). The brake ECU 70 determines that raising of the target pressure should to be permitted when an estimated degree of discomfort given to the driver due to a delay in the timing at which the hydraulic braking force starts rising exceeds the tolerable limit. On the other hand, the brake ECU 70 determines that raising of the target pressure should not be permitted if the estimated degree of discomfort given to the driver is below the tolerable limit. Another example of the target pressure raising permission determination control will be described later with reference to FIG. 9. If it is determined that raising of the target pressure should not be permitted ("NO" in S12), the brake ECU 70 ends the control without executing the target pressure raising control.

On the other hand, if it is determined that raising of the target pressure should be permitted ("YES" in S12), the brake ECU 70 executes the target pressure raising control (S14). In the regular states in which the target pressure raising control is not executed, the brake ECU 70 sets the required hydraulic braking force to a value obtained by subtracting the regenerative braking force from the required braking force. In contrast, in the target pressure raising control, the brake ECU 70 sets the required hydraulic braking force to a value that is larger than the value obtained by subtracting the regenerative braking force from the required braking force. In other words, the brake ECU 70 sets the target value of the wheel cylinder pressure to a value that is larger than the normal value so that a hydraulic braking force that is larger than the value obtained by subtracting the regenerative braking force from the required braking force is generated. An example of the target pressure raising control will be described with reference to FIGS. 9 and 10. When the target pressure raising control is completed, the brake ECU 70 ends the control shown in FIG. 7.

Figure 8:
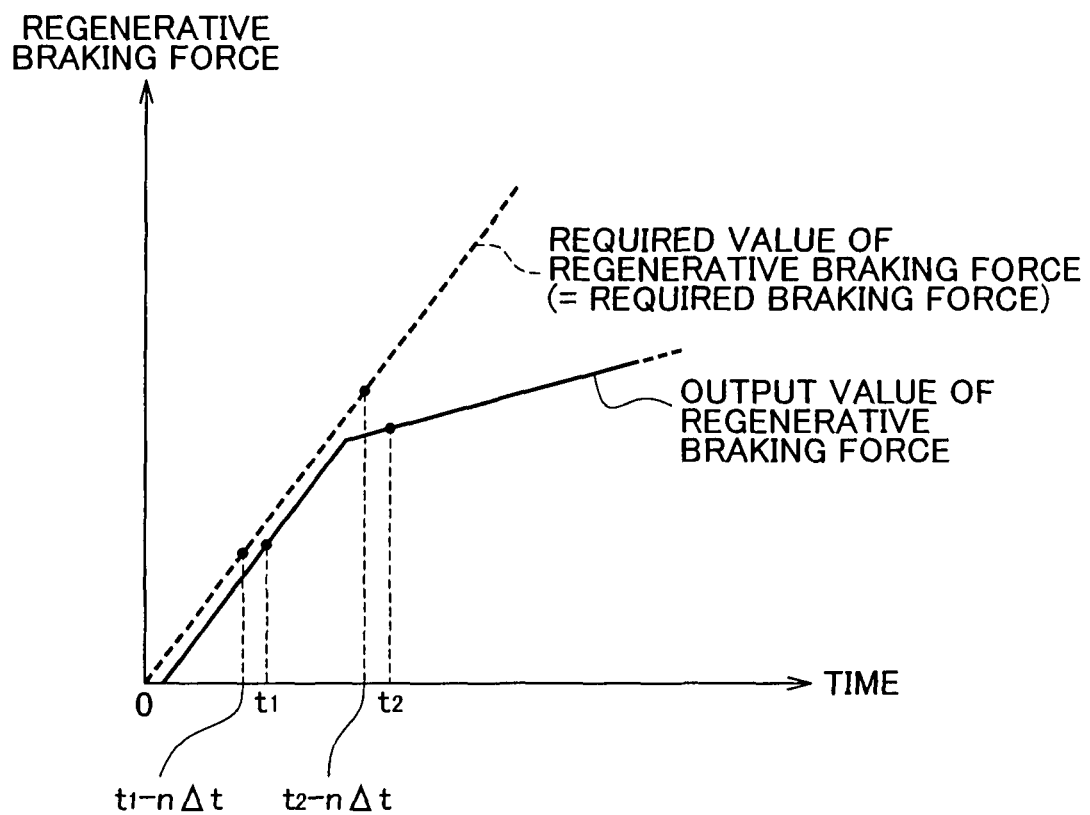
FIG. 8 is a graph for describing a switch timing determination control according to the embodiment of the invention.

FIG. 8 is a graph for describing an example of the brake control mode switch timing determination control according to the embodiment of the invention. The brake ECU 70 performs the brake control mode switch timing determination control by comparing the required braking force with the actual output value of the regenerative braking force. When the regenerative braking force is preferentially used, as in the embodiment of the invention, the required braking force is also a required value of the regenerative braking force. FIG. 8 shows the required value of the regenerative braking force and the actual output value of the regenerative braking force. In FIG. 8, the ordinate axis represents the magnitude of the regenerative braking force, and the abscissa axis represents the time that has elapsed after issuance of a braking command. In the embodiment of the invention, the detected brake control mode switch timing is used as the timing at which the target pressure raising control is started. Alternatively, the brake ECU 70 may use the detected brake control mode switch timing as the timing at which another pressure-increase promotion control or a control other than the pressure-increase promotion control is started.

The brake ECU 70 estimates the brake control mode switch timing by comparing the required value of the regenerative braking force with the actual output value of the regenerative braking force. In the embodiment of the invention, the brake ECU 70 determines whether the detected output value of the regenerative braking force is smaller than the required value of the regenerative braking force that is prepared a predetermined time before detection of the output value. The brake ECU 70 estimates that the brake control mode switch timing is reached, that is, the timing, at which usage of the hydraulic braking force needs to be started to compensate for a deficiency from the required braking force, is reached, when it is determined that the detected output value is smaller than the required value that is prepared the predetermined time before detection of the output value. The brake ECU 70 determines that the output value is smaller than the required value that is prepared the predetermined time before detection of the output value, when it is determined the state, in which the current output value is smaller than the require value that is prepared the predetermined time before detection of the current output value, continues for a time that exceeds a determination reference time. Alternatively, the brake ECU 70 may determine that the output value is smaller than the required value that is prepared the predetermined time before detection of the output value, when the current output value falls below the required value that is prepared the predetermined time before detection of the current output value.

As described above, in the embodiment of the invention, the required value of the regenerative braking force is set based on the required braking force calculated by the brake ECU 70, and transmitted from the brake ECU 70 to the hybrid ECU 7. The hybrid ECU 7 controls the regenerative brake unit based on the received required value, detects the output value of the regenerative braking force, and transmits the detected output value to the brake ECU 70. Because a predetermined communication time is required to exchange signals between the hybrid ECU 7 and the brake ECU 70, the output value of the regenerative braking force received by the brake ECU 70 is a value that corresponds to the required value transmitted from the brake ECU 70 the predetermined time before the reception of the output value. Therefore, it is possible to make a determination more accurately by taking into account a time lag between transmission of the required value of the regenerative braking force and reception of the output value of the regenerative braking force when the output value and the required value are compared with each other in the brake control mode switch timing determination control.

More specifically, the brake ECU 70 compares the newest output value of the regenerative braking force with the required value of the regenerative braking force that is prepared in the n'th preceding calculation cycle. Here, n is a positive integral number. When the calculation cycle is expressed by $\Delta t$, the brake ECU 70 compares the current output value of the regenerative braking force with the required value that is prepared in the calculation cycle $n\Delta t$ (n'th preceding calculation cycle). The number of times of calculation n that corresponds to the time difference between transmission of the required value of the regenerative braking force and reception of the output value of the regenerative braking force is set with the time required for the communication between the hybrid ECU 7 and the brake ECU 70 taken into account. The number of times of calculation n is set so as to correspond to the time required from when the brake ECU 70 transmits the required value until when the brake ECU 70 receives the output value that corresponds to the transmitted required value.

When the output value of the regenerative braking force and the required value of the regenerative braking force are expressed by A and B, respectively, as shown in FIG. 8, the output value $A(t_1)$ of the regenerative braking force at time $t_1$ is larger than the required value $B(t_1-n\Delta t)$ that is prepared in the n'th preceding calculation cycle and that is compared with the output value $A(t_1)$. In this case, the brake ECU 70 does not regard time $t_1$ as the brake control mode switch timing. At time $t_2$, the output value $A(t_2)$ of the regenerative braking force falls below the required value $B(t_2-n\Delta t)$ that is prepared in the N'th preceding calculation cycle and that is compared with the output value $A(t_2)$. In this case, the brake ECU 70 regards time $t_2$ as the brake control mode switch timing. The brake ECU 70 may set the brake control mode switch timing to the timing at which the output value A falls below the required value B that is prepared in the N'th preceding calculation cycle and that is compared with the output value A. Alternatively, the brake ECU 70 may set the brake control mode switch timing to the timing at which it is determined that the state, in which the output value A falls below the required value B that is prepared in the N'th preceding calculation cycle and that is compared with the output value A, continues for a time that exceeds the determination reference time. In order to promptly detect the brake control mode switch timing, the determination reference time should be as short as possible. On the other hand, in order to prevent an erroneous determination, the determination reference time should be sufficiently long. The determination reference time may be empirically determined.

In the embodiment of the invention, it is possible to detect the brake control mode switch timing by comparing the output value of the regenerative braking force with the required value of the regenerative braking force that is prepared at the same time of the reception of this output value. However, while the required value is increasing as in the embodiment of the invention, an increase in the output value is preceded by an increase in the required value due to the above-described communication time. Therefore, the required value is basically larger than the output value. Therefore, the brake ECU 70 may determine that the brake control mode switch timing is reached when the difference between the required value and the output value exceeds a predetermined threshold value. Alternatively, the brake ECU 70 may determine that the brake control mode switch timing is reached when it is determined that the state, in which the difference exceeds the threshold value, continues for a time that exceeds a reference time. In this case, in order to prevent an erroneous determination, the threshold value should be set to a sufficiently large value. In contrast, when the output value of the regenerative braking force is compared with the required value of the regenerative braking force that is prepared the predetermined time before the reception of the output value as described above, the threshold value may be substantially zero (that is, the output value is just compared with the required value that is prepared the predetermined time before reception of the output value, as described above). Therefore, it is possible to detect the brake control mode switch timing more accurately and promptly.

Figure 9:
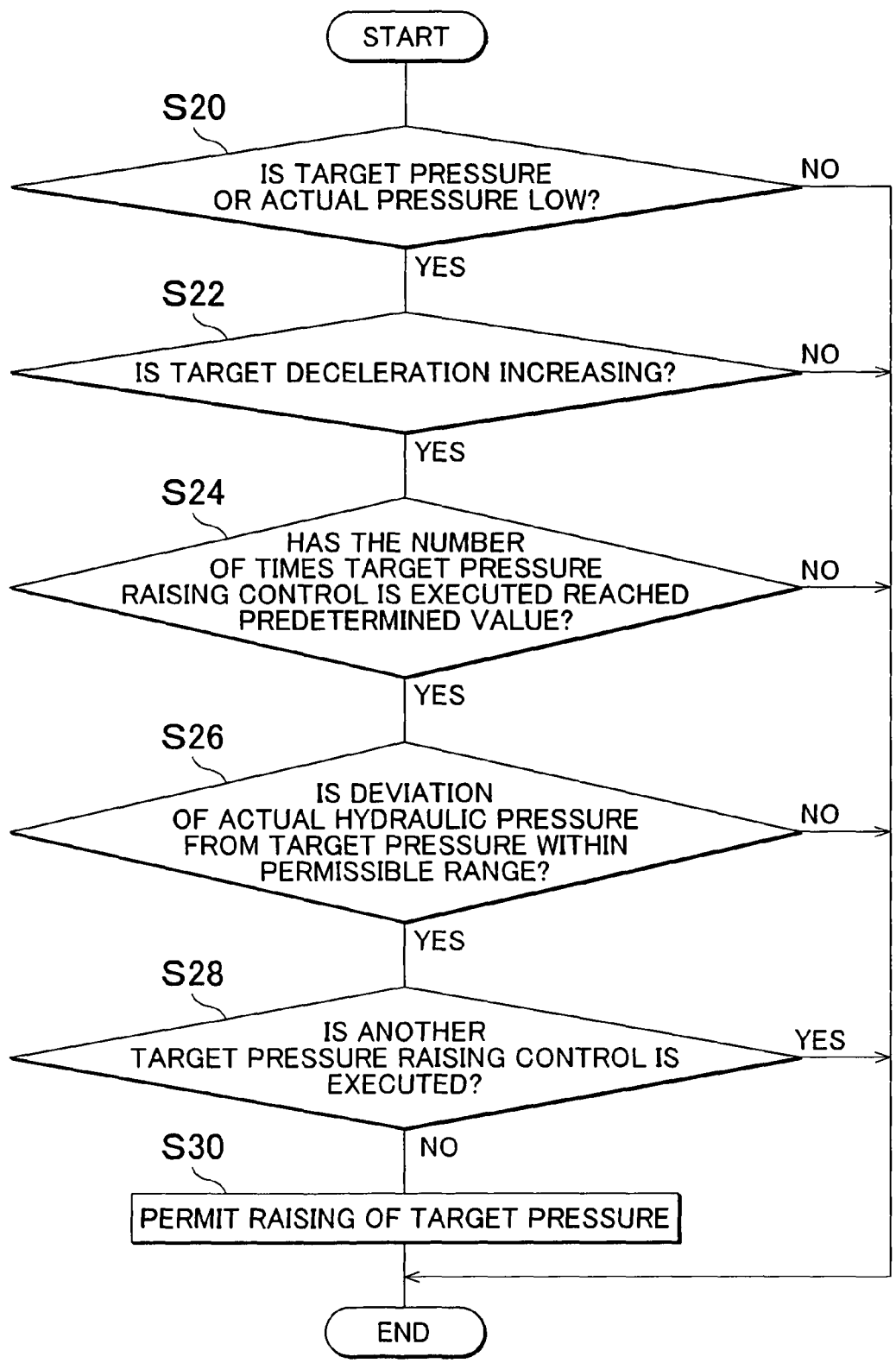
FIG. 9 is a flowchart showing an example of a target pressure raising permission determination control according to the embodiment of the invention.

FIG. 9 is a flowchart showing an example of a target pressure raising permission determination control (S12 in FIG. 7) according to the embodiment of the invention. The order of making determinations on the multiple conditions described below may be changed on an as-required basis. In the following description, the determinations on the multiple conditions are performed one-by-one. Alternatively, determinations on some conditions may be performed at the same time. Further alternatively, part of the permission conditions may be selected in advance, and execution of the target pressure raising control may be permitted when the selected conditions are satisfied. Alternatively, the condition other than the conditions described below may be added to the permission conditions.

As shown in FIG. 9, the brake ECU 70 determines whether the target pressure or the actual hydraulic pressure of the wheel cylinder 23 is within a predetermined low-pressure region (S20). That is, the brake ECU 70 determines whether the target pressure or the actual hydraulic pressure is lower than the target pressure raising permission hydraulic pressure. If it is determined that the target pressure or the actual hydraulic pressure is not within the predetermined low-pressure region ("NO" in S20), the brake ECU 70 does not permit execution of the target pressure raising control. On the other hand, if it is determined that the target pressure or the actual hydraulic pressure is within the predetermined low-pressure region ("YES" in S20), the brake ECU 70 determines whether the other conditions are satisfied. Alternatively, if it is determined that the target pressure or the actual hydraulic pressure is within the predetermined low-pressure region, the brake ECU 70 may permit execution of the target pressure raising control. When the brake fluid pressure is low, it is relatively difficult to increase the hydraulic pressure in response to an increase in the brake operation amount. Therefore, the response of the hydraulic pressure to the control tends to be slow. Accordingly, if the condition that the target pressure or the actual hydraulic pressure is within the low-pressure region is used as the permission condition in the target value raising control, it is possible to effectively reduce the influence of the delay in response of the hydraulic pressure to the control. When the low pressure region is set, the estimated amount of delay in response of the hydraulic pressure to the control and the influence of the delay in response of the hydraulic pressure on the braking feel may be taken into account.

The brake ECU 70 determines whether the target deceleration is increasing (S22). If the target pressure is raised when the target deceleration, that is, the required braking force is decreasing or maintained, braking feel may be adversely affected. If it is determined that the target deceleration is decreasing or maintained ("NO" in S22), the brake ECU 70 does not permit execution of the target pressure raising control. On the other hand, if it is determined that the target deceleration is increasing ("YES" in S22), the brake ECU 70 determines whether the other conditions are satisfied. If it is determined that the target deceleration is increasing, the brake ECU 70 may permit execution of the target pressure raising control. The brake ECU 70 may calculate the rate of change in the target deceleration based on the values of the target deceleration in immediately preceding multiple calculation cycles. If the rate of change in the target deceleration is a positive value or larger than a predetermined positive threshold value, the brake ECU 70 may determine that the target deceleration is increasing. The actual vehicle deceleration may be used instead of the target deceleration.

The brake ECU 70 determines whether the number of times the target pressure raising control is executed during the current brake operation reaches the predetermined number of times (S24). The predetermined number of times is set as the upper limit of the number of times the target pressure raising control is executed in one brake operation. Usually, the predetermined number of times is once or twice. By restricting the number of times the target pressure raising control is executed in this manner, it is possible to prevent the target pressure from being excessively raised. If it is determined that the number of times the target pressure raising control is executed has reached the predetermined number of times ("NO" in S24), the brake ECU 70 does not permit execution of the target pressure raising control. On the other hand, if it is determined that the number of times the target pressure raising control is executed has not reached the predetermined number of times ("YES" in S24), the brake ECU 70 may determine whether the other conditions are satisfied or permit execution of the target pressure raising control.

The brake ECU 70 determines whether the deviation of the actual hydraulic pressure from the target pressure of the wheel cylinder 23 is within the permissible range, that is, the dead-band width (S26). In other words, the brake ECU 70 determines whether the control mode of the hydraulic braking force is the pressure-maintaining mode. The brake ECU 70 determines whether the control mode is the pressure-maintaining mode, because the target pressure raising control according to the embodiment of the invention is the control for promoting mode switching from the pressure-maintaining mode to the pressure-increasing mode. It is considered that the brake control mode is already brought to the pressure-increasing mode, if the brake control mode is not the pressure-maintaining mode while the required braking force is increasing as in the embodiment of the invention. Therefore, if the brake control mode is not the pressure-maintaining mode, it is not necessary to execute the target pressure raising control. If it is determined that the deviation of the actual hydraulic pressure from the target pressure is not within the permissible range ("NO" in S26), the brake ECU 70 does not permit execution of the target pressure raising control. On the other hand, if it is determined that the deviation of the actual hydraulic pressure from the target pressure is within the permissible range ("YES" in S26), the brake ECU 70 may determine whether the other conditions are satisfied, or permit execution of the target pressure raising control.

The brake ECU 70 determines whether target pressure raising control other than the target pressure raising control according to the embodiment of the invention is executed (S28). In some cases, the target pressure may have been already raised for the purpose that is different from that of the target pressure raising control according to the embodiment of the invention. In this case, it is not necessary to execute the target pressure raising control according to the embodiment of the invention, because the target pressure may be excessively increased if the target pressure raising control according to the invention is executed in addition to the other target pressure raising control. Examples of the other target pressure raising control include control for increasing the target pressure on an as-required basis based on, for example, the speed at which the driver depresses the brake pedal and the vehicle speed in order to compensate for a delay in response of the actual hydraulic pressure at the early stage of the brake operation performed by the driver. This control is executed usually immediately after the driver starts the brake operation. Therefore, this control is executed before the target pressure raising control according to the embodiment of the invention is started. If it is determined that the target pressure has already been raised by another control ("YES" in S28), the brake ECU 70 does not permit execution of the target pressure raising control according to the embodiment of the invention. On the other hand, if it is determined that target pressure has not been raised by another control ("NO" in S28), the brake ECU 70 permits execution of the target pressure raising control (S30). If it is determined that the target pressure has not been raised by another control, the brake ECU 70 may determine whether other conditions are satisfied before permitting execution of the target pressure raising control.

The brake ECU 70 executes the target pressure raising permission determination control in the above-described manner. When execution of the target pressure raising control is permitted, the brake ECU 70 sets and stores a target pressure raising permission flag.

Figure 10:
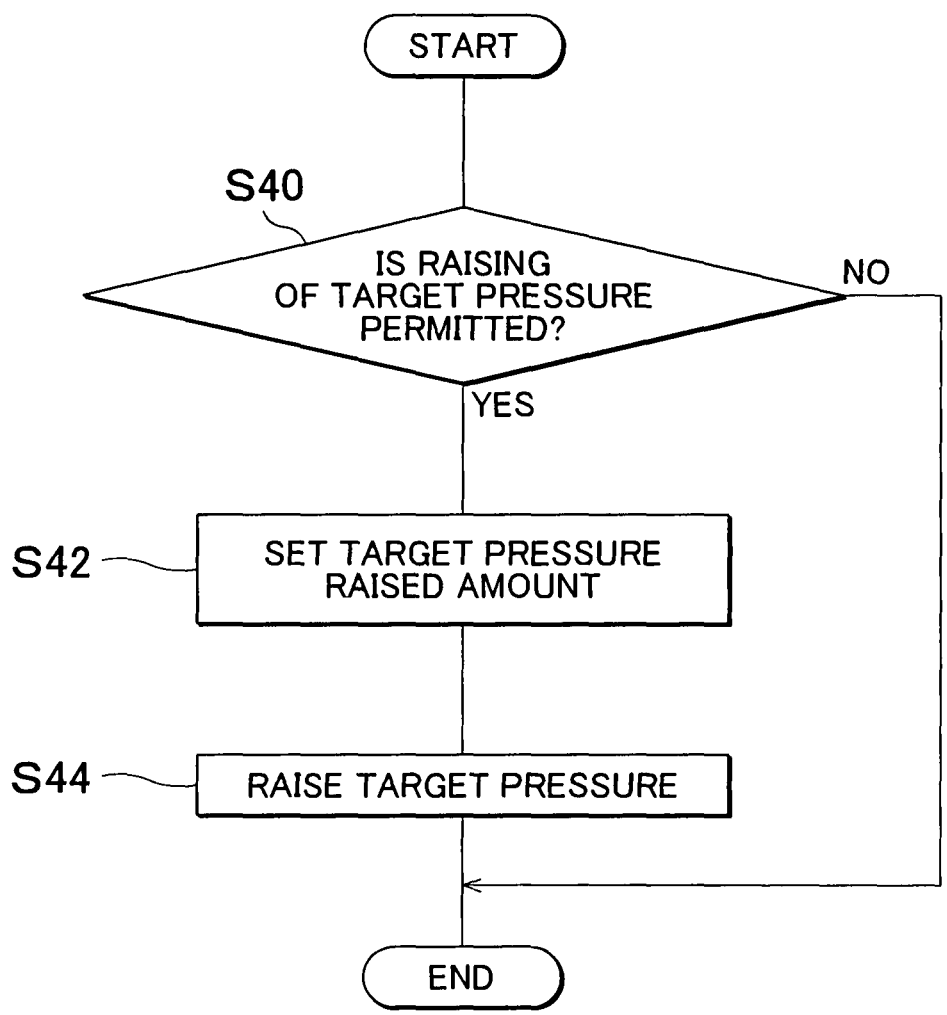
FIG. 10 is a flowchart showing an example of target pressure raising control according to the embodiment of the invention.

FIG. 10 is a flowchart showing an example of the target pressure raising control (S14 in FIG. 7) according to the embodiment of the invention. The brake ECU 70 determines whether execution of the target pressure raising control is permitted (S40). The brake ECU 70 determines whether execution of the target pressure raising control is permitted, for example, by checking the target pressure raising permission flag. If it is determined that execution of the target pressure raising control is not permitted ("NO" in S40), the brake ECU 70 ends the control.

On the other hand, if it is determined that execution of the target pressure raising control is permitted ("YES" in S40), the brake ECU 70 sets the amount by which the target pressure should be raised (hereinafter, referred to as "target pressure raised amount") (S42). The brake ECU 70 may set the target pressure raised amount in such a manner that the deviation of the actual hydraulic pressure from the target pressure falls outside the permissible range in the pressure-maintaining mode, that is, the deviation exceeds the dead-band width in the pressure-maintaining mode. Alternatively, the brake ECU 70 may set the target pressure raised amount in such a manner that the deviation of the actual hydraulic pressure from the target pressure does not exceed the dead-band width. In order to promote rising of the actual hydraulic pressure, the target pressure raised amount should be set to a larger value. However, setting a large target pressure raised amount may cause some adverse effects on the braking feel, for example, uncomfortable flowing noise of the brake fluid may be caused due to an abrupt change in the target pressure. Therefore, preferably, the target pressure raised amount is set to an appropriate value with these matters taken into account. In addition, the brake ECU 70 raises the target pressure by adding the set target pressure raised amount to the target pressure (S44). Then, the brake ECU 70 controls, for example, the pressure-increasing linear control valve 66 so that the actual hydraulic pressure increases in response to the raised target pressure.

Figure 11:
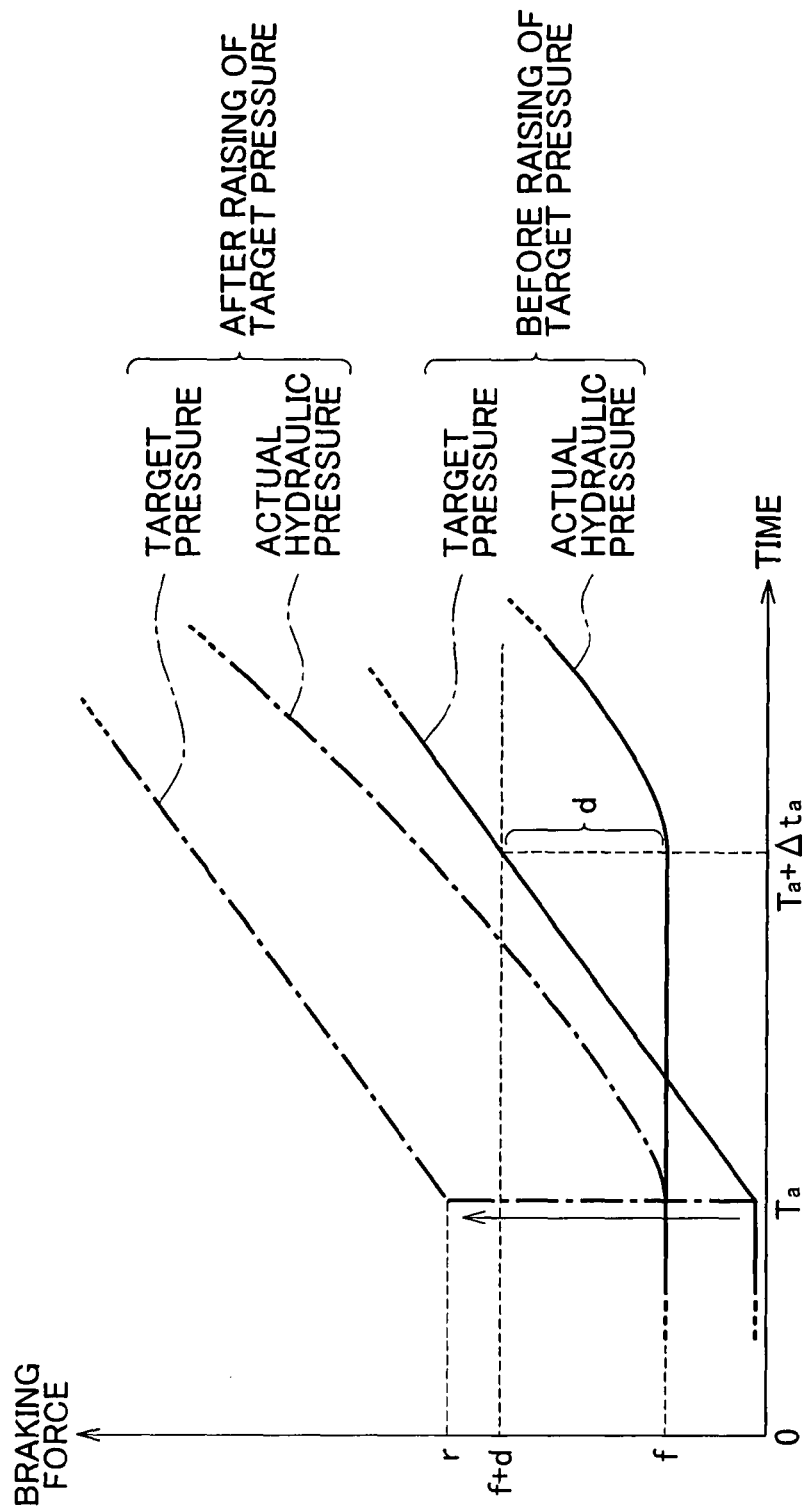
FIG. 11 is a graph for describing an example of the target pressure raising control according to the embodiment of the invention.

FIG. 11 is a graph for describing the target pressure raising control according to the embodiment of the invention. FIG. 11 shows temporal changes in the target pressure and the actual hydraulic pressure immediately before and after the brake control mode switch timing $T_a$ shown in FIG. 5. FIG. 5 shows temporal changes in the target pressure and the actual hydraulic pressure when the target pressure raising control according to the embodiment of the invention is executed, and temporal changes in the target pressure and the actual hydraulic pressure when the target pressure raising control according to the embodiment of the invention is not executed. In FIG. 11, the target pressure and the actual hydraulic pressure when the target pressure raising control is executed are indicated by dashed-dotted lines, and the target pressure and the actual hydraulic pressure when the target pressure raising control is not executed are indicated by solid lines. Because the required braking force is correlated with the target pressure, the required braking force changes in a manner similar to the manner in which the target pressure changes as shown in FIG. 11. In addition, the actual hydraulic braking force is correlated with the actual hydraulic pressure. Therefore, the actual hydraulic braking force changes in a manner similar to the manner in which the actual hydraulic pressure changes as shown in FIG. 11.

When the target pressure raising control according to the embodiment of the invention is not executed, the target pressure is substantially equal to zero and the actual hydraulic pressure is maintained at the predetermined pressure f that is higher than the target pressure and that falls within the dead-band width d until the brake control mode switch timing $T_a$, as described above with reference to FIG. 6. When the brake control mode switch timing $T_a$ is reached, the target pressure starts increasing. The actual hydraulic pressure starts increasing only after the target pressure exceeds the actual hydraulic pressure and the deviation of the actual hydraulic pressure from the target pressure exceeds the dead-band width d. That is, when the target pressure exceeds the hydraulic pressure f+d, the brake control mode is switched from the pressure-maintaining mode to the pressure-increasing mode. As shown in FIG. 5, the brake ECU 70 switches the brake control mode to the pressure-increasing mode at the switch timing $T_a+\Delta t_a$ that is reached when the delay time $\Delta t_a$ has elapsed after the brake control mode switch timing $T_a$.

When the target pressure raising control according to the embodiment of the invention is executed, the brake ECU 70 increases the target pressure by a target pressure raised amount r when it is determined that the brake control mode switch timing $T_a$ is reached. As indicated by an arrow in FIG. 11, the target pressure raised amount r is set in such a manner that the deviation of the actual hydraulic pressure f from the target pressure r after the target pressure is raised exceeds the dead-band width d. Thus, the brake ECU 70 switches the hydraulic pressure control mode from the pressure-maintaining mode to the pressure-increasing mode at the brake control mode switch timing $T_a$. As shown in FIG. 11, the actual hydraulic pressure starts increasing immediately at the brake control mode switch timing $T_a$.

In FIG. 11, the actual hydraulic pressure after the target pressure raising control is executed exceeds the target pressure before the target pressure raising control is executed, and the line indicating the actual hydraulic pressure after the target pressure raising control is executed and the line indicating the target pressure before the target pressure raising control is executed do not intersect with each other. However, the actual hydraulic pressure and the target pressure are expressed in this way in FIG. 11 just to facilitate the understanding. The actual hydraulic pressure after the target pressure raising control is executed may exceed the target pressure before the target pressure raising control is executed, or may fall bellow the target pressure before the target pressure raising control is executed. The line indicating the actual hydraulic pressure after the target pressure raising control is executed and the line indicating the target pressure before the target pressure raising control is executed may intersect with each other. The brake ECU 70 may set the target pressure raised amount r in such a manner that the difference between the actual hydraulic pressure after the target pressure raising control is executed and the target pressure before the target pressure raising control is executed is minimized. The target pressure before the target pressure raising control is executed is the target pressure for generating the hydraulic braking force that corresponds to the difference between the required braking force and the regenerative braking force. Thus, the difference between the actual total braking force after the target pressure raising control is executed and the required braking force is minimized.

In FIG. 11, the target pressure raised amount r is added to the target pressure all at once. Alternatively, the target pressure raised amount r may be divided into multiple portions, and added to the target pressure in a stepwise manner. When different target pressures are set for the respective multiple wheel cylinders 23, different target pressure raised amounts may be set for the respective wheel cylinders 23.

Hereafter, an example of the control for setting the target pressure raised amount r (S42 in FIG. 10) will be described. The brake ECU 70 calculates the target pressure raised amount r, for example, in the following manner. First, the brake ECU 70 determines whether the value obtained by subtracting the actual hydraulic pressure from the target pressure is smaller than the dead-band width d. If it is determined that the value obtained by subtracting the actual hydraulic pressure from the target pressure is smaller than the dead-band width d, the brake ECU 70 calculates the target pressure raised amount r, for example, by the following equation.

Target pressure raised amount r=(actual hydraulic pressure−target pressure+basic target pressure raised amount α)+immediately preceding value The immediately preceding value is the target pressure raised amount r in the immediately preceding calculation cycle, and the initial value of the immediately preceding value is zero (the immediately preceding value is zero when the target pressure raising control is executed for the first time). The difference between the actual hydraulic pressure and the target pressure corresponds to the predetermined pressure f in FIG. 11. Therefore, in the early stage of the brake operation, the target pressure raised amount r is the sum of the predetermined pressure f and the basic target pressure raised amount α. Therefore, the target pressure that is raised at the brake control mode switch timing $T_a$ is a value that is larger than the actual hydraulic pressure by the basic target pressure raised amount α. The basic target pressure raised amount α is set to, for example, a value that is smaller than the dead-band width d. When it is determined that the value obtained by subtracting the actual hydraulic pressure from the target pressure is equal to or larger than the dead-band width d, the brake ECU 70 maintains the immediately preceding value as the target pressure raised amount r. Thus, only when the deviation of the actual hydraulic pressure from the target pressure is smaller than the dead-band width and the brake control mode is maintained at the pressure-maintaining mode, the target pressure raised amount r is increased in a stepwise manner by the basic target pressure raised amount α. Therefore, it is possible to prevent the target pressure raised amount r from being excessively increased abruptly.

Figure 12:
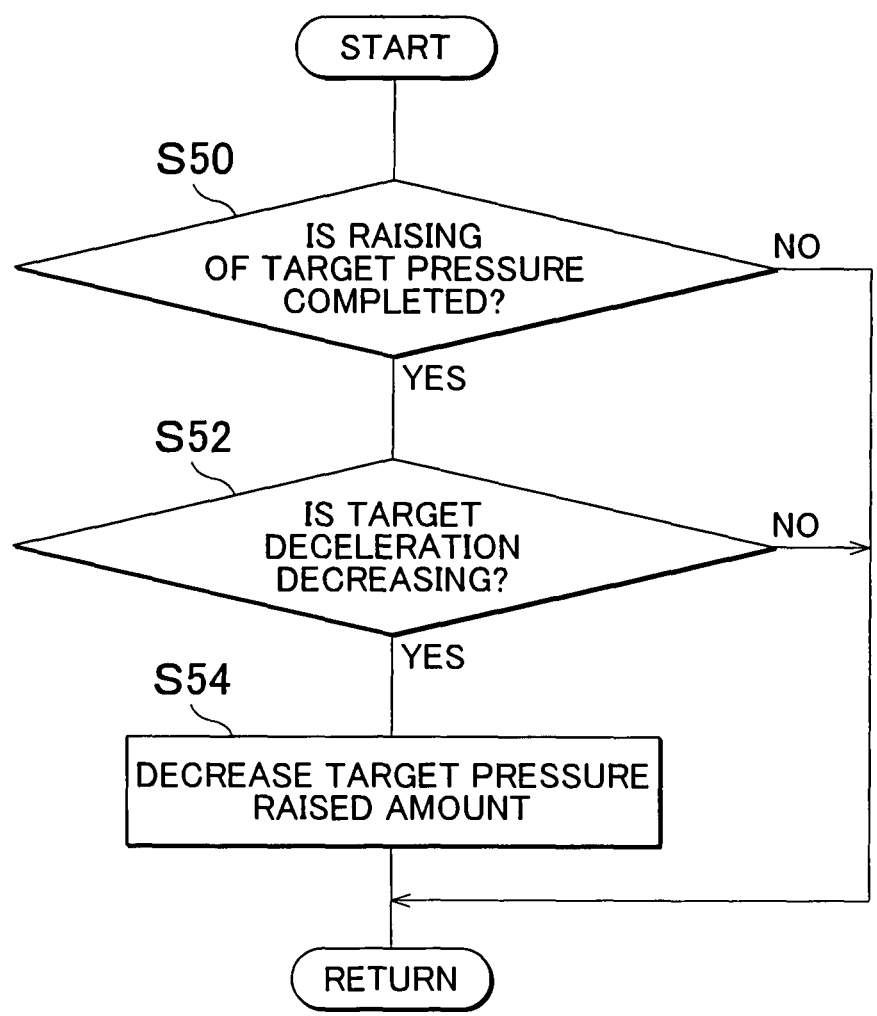
FIG. 12 is a flowchart showing an example of a target pressure raising cancellation control.

FIG. 12 is a flowchart showing an example of a target pressure raising cancellation control according to the embodiment of the invention. In the embodiment of the invention, raising of the target pressure is cancelled by decreasing the target pressure raised amount while the target deceleration of the vehicle is decreasing. Decreasing the target pressure raised amount while the deceleration of the vehicle is decreasing makes it possible to cancel raising of the target pressure while minimizing the influence on the braking feel.

The control shown in FIG. 12 is periodically executed by, for example, the brake ECU 70 during the brake operation. First, the brake ECU 70 determines whether the target pressure raising control is completed (S50). S50 is executed in order to prevent the target pressure from unnecessarily decreased by executing the cancellation control before or during the above-described target pressure raising control. If it is determined that the target pressure raising control is not completed ("NO" in S50), the brake ECU 70 ends the cancellation control.

On the other hand, if it is determined that the target pressure raising control is completed ("YES" in S50), the brake ECU 70 determines whether the target deceleration is decreasing (S52). By decreasing the target pressure raised amount while the target deceleration is decreasing, that is, while the brake operation is being cancelled, the influence on the braking feel is minimized. The brake ECU 70 may calculate the rate of change in the target deceleration based on the values of the target deceleration in the immediately preceding multiple calculation cycles. The brake ECU 70 may determine that the target deceleration is decreasing when the rate of change in the target deceleration is a negative value or is larger than a predetermined negative threshold value. Instead of the target deceleration, the actual vehicle deceleration may be used. If it is determined that the target deceleration is increasing or maintained ("NO" in S52), the brake ECU 70 ends the cancellation control.

If it is determined that the target deceleration is decreasing ("YES" in S52), the brake ECU 70 decreases the target pressure raised amount (S54). The amount by which the target deceleration raised amount is decreased may be set based on the rate of change in the target deceleration. That is, as the rate of change in the target deceleration is larger, the target pressure raised amount may be decreased by a larger amount. When the brake operation is cancelled, the brake ECU 70 may reset the target pressure raised amount.

According to the embodiment of the invention, the brake ECU 70 detects the timing at which usage of the hydraulic braking force needs to be started to compensate for a deficiency from the required braking force, and executes the control for raising the target value of the hydraulic braking force at the detected timing. Thus, the timing at which the hydraulic braking force starts increasing is advanced, which makes it possible to smoothly switch the brake control mode to the brake control mode in which the hydraulic braking force is used in combination with the regenerative braking force. Therefore, it is possible to achieve good braking feel.

In the embodiment of the invention, the wheel cylinder target pressure raising control is described as an example of the pressure-increase promotion control. However, the pressure-increase promotion control is not limited to the wheel cylinder target pressure raising control. The pressure-increase promotion control may be control for reducing the time required to switch the brake control mode from the pressure-maintaining mode to the pressure-increasing mode, or control for forcibly switching the brake control mode to the pressure-increasing mode. Instead of executing the above-described target pressure raising control, for example, the dead-band width may be reduced. In this case, the brake ECU 70 may detect, for example, the timing at which usage of the hydraulic braking force needs to be started to compensate for a deficiency from the required braking force, and reduce the permissible range, that is, the dead-band width in the pressure-maintaining mode at the detected timing. The time required to switch the brake control mode to the pressure-increasing mode is reduced in the above-described manner. Therefore, it is possible to smoothly switch the brake control modes.

Instead of executing the above-described target pressure raising control, for example, the control current that is supplied to the pressure-increasing linear control valve 66 may be raised. In this case, the brake ECU 70 may detect the timing at which usage of the hydraulic braking force needs to be started to compensate for a deficiency from the required braking force, and raise the control current that is supplied to the pressure-increasing control valve for the wheel cylinder at the detected timing. In this manner as well, the response of the wheel cylinder pressure to the control is improved. Therefore, the time that is required to switch the brake control mode to the pressure-increasing mode is reduced. As a result, it is possible to smoothly switch the brake control modes.

The invention claimed is:

1. A brake control apparatus that obtains a required braking force using a hydraulic braking force in combination with a regenerative braking force, comprising:
   a hydraulic brake unit that controls the hydraulic braking force, wherein when a deviation of an actual hydraulic pressure from a target pressure falls outside a permissible range, the hydraulic brake unit controls the actual hydraulic pressure in such a manner that the deviation falls within the permissible range, whereas when the deviation is within the permissible range, the hydraulic brake unit maintains the actual hydraulic pressure,
   wherein the hydraulic brake unit includes a control unit that determines timing at which usage of the hydraulic braking force needs to be started to compensate for a deficiency from the required braking force, and that raises the target pressure at the determined timing or that executes pressure-increase promotion control so that the actual hydraulic pressure starts increasing at the determined timing
   wherein the control unit determines that usage of the hydraulic braking force is started, to compensate for the deficiency from the required braking force, when a state continues for a time that exceeds a determination reference time, the state being when an actual output value of the regenerative braking force is smaller than a required braking force that is prepared a predetermined time before detection of the actual output value, the predetermined time accounting for a time between the control unit preparing the required braking force and receiving the actual output value based on the required braking force.

2. The brake control apparatus according to claim 1, wherein the control unit raises the target pressure at the detected timing in such a manner that the deviation falls outside the permissible range.

3. The brake control apparatus according to claim 1, wherein the control unit raises the target pressure on condition that the target pressure or the actual hydraulic pressure is within a predetermined low-pressure region.

4. The brake control apparatus according to claim 1, wherein the control unit raises the target pressure on condition that the required braking force is increasing.

5. A brake control apparatus that obtains a required braking force using a hydraulic braking force in combination with a regenerative braking force, comprising:
a hydraulic brake unit that controls the hydraulic braking force, wherein when a deviation of an actual hydraulic pressure from a target pressure falls outside a permissible range, the hydraulic brake unit controls the actual hydraulic pressure in such a manner that the deviation falls within the permissible range, whereas when the deviation is within the permissible range, the hydraulic brake unit maintains the actual hydraulic pressure,
wherein the hydraulic brake unit includes a control unit that detects timing at which usage of the hydraulic braking force needs to be started to compensate for a deficiency from the required braking force, and that raises the target pressure at the detected timing or that executes pressure-increase promotion control so that the actual hydraulic pressure starts increasing at the detected timing,
wherein the control unit regards timing, at which it is determined that an actual output value of the regenerative braking force is smaller than the required braking force that is prepared a predetermined time before detection of the output value, or timing at which it is determined that the state in which an actual output value of the regenerative braking force is smaller than the required braking force that is prepared the predetermined time before detection of the output value, continues for a time that exceeds a determination reference time, as timing at which usage of the hydraulic braking force needs to be started to compensate for the deficiency from the required braking force, the predetermined time accounting for a time between the control unit preparing the required braking force and receiving the actual output value based on the required braking force, and
wherein the control unit raises the target pressure on condition that the deviation is within the permissible range.

6. The brake control apparatus according to claim 1, wherein:
the control unit is able to execute first target pressure raising control for raising the target pressure at the detected timing, and second target pressure raising control for compensating for a delay in response of the actual hydraulic pressure to the target pressure in an early stage of a brake operation, the first target pressure raising control being preceded by the second target pressure raising control; and
the first target pressure raising control is executed on condition that the second target pressure raising control is not executed.

7. The brake control apparatus according to claim 1, wherein the control unit restricts the number of times the target pressure is raised during one brake operation to a predetermined value.

8. The brake control apparatus according to claim 1, wherein the control unit cancels raising of the target pressure while the required braking force is decreasing.

9. A method for controlling a brake control apparatus that obtains a required braking force using a hydraulic braking force in combination with a regenerative braking force, comprising:
executing control over the hydraulic braking force, wherein when a deviation of an actual hydraulic pressure from a target pressure falls outside a permissible range, the actual hydraulic pressure is controlled in such a manner that the deviation falls within the permissible range, and when the deviation is within the permissible range, the actual hydraulic pressure is maintained;
determining timing at which usage of the hydraulic braking force needs to be started to compensate for a deficiency from the required braking force; and
raising the target pressure at the determined timing or executing pressure-increase promotion control so that the actual hydraulic pressure starts increasing at the determined timing
wherein it is determined that usage of the hydraulic braking force needs to be started to compensate for the deficiency from the required braking force when it is determined that a state continues for a time that exceeds a determination reference time, the state being when an actual output value of the regenerative braking force is smaller than the required braking force that is prepared a predetermined time before detection of the actual output value, the predetermined time accounting for a time between a control unit preparing the required braking force and receiving the actual output value based on the required braking force.

10. The method according to claim 9, wherein the target pressure is raised at the detected timing in such a manner that the deviation falls outside the permissible range.

11. The method according to claim 9, wherein the target pressure is raised on condition that the target pressure or the actual hydraulic pressure is within a predetermined low-pressure region.

12. The method according to claim 9, wherein the target pressure is raised on condition that the required braking force is increasing.

13. A method for controlling a brake control apparatus that obtains a required braking force using a hydraulic braking force in combination with a regenerative braking force, comprising:
executing control over the hydraulic braking force, wherein when a deviation of an actual hydraulic pressure from a target pressure falls outside a permissible range, the actual hydraulic pressure is controlled in such a manner that the deviation falls within the permissible range, and when the deviation is within the permissible range, the actual hydraulic pressure is maintained;
detecting timing at which usage of the hydraulic braking force needs to be started to compensate for a deficiency from the required braking force; and
raising the target pressure at the detected timing or executing pressure-increase promotion control so that the actual hydraulic pressure starts increasing at the detected timing
wherein timing, at which it is determined that an actual output value of the regenerative braking force is smaller than the required braking force that is prepared a predetermined time before detection of the output value, or timing at which it is determined that the state in which an actual output value of the regenerative braking force is smaller than the required braking force that is prepared a predetermined time before detection of the output value, continues for a time that exceeds a determination reference time, is regarded as timing at which usage of the hydraulic braking force needs to be started to compensate for the deficiency from the required braking force, the predetermined time accounting for a time between a control unit preparing the required braking force and receiving the actual output value based on the required braking force, and wherein the target pressure is raised on condition that the deviation is within the permissible range.

14. The method according to claim 9, wherein
first target pressure raising control for raising the target pressure at the timing is executed, and second target pressure raising control for compensating for a delay in response of the actual hydraulic pressure to the target pressure is executed in an early stage of a brake operation, the first target pressure raising control being preceded by the second target pressure raising control; and
the first target pressure raising control is executed on condition that the second target pressure raising control is not executed.

15. The method according to claim 9, wherein the number of times the target pressure is raised during one brake operation is restricted to a predetermined value.

16. The method according to claim 9, wherein raising of the target pressure is cancelled while the required braking force is decreasing.

* * * * *